United States Patent
Tupa et al.

(10) Patent No.: US 11,781,748 B2
(45) Date of Patent: Oct. 10, 2023

(54) PUSH/PULL FURNACE AND METHODS RELATED THERETO

(71) Applicant: Trane International Inc., Davidson, NC (US)

(72) Inventors: Timothy J. Tupa, Santa Rosa Beach, FL (US); Justen William Grubb, Clarksville, TN (US); Caleb R. Joiner, Clarksville, TN (US); William James Teising, Nashville, TN (US); Stephen Kowalski, Clarksville, TN (US); Gary L. Wright, Clarksville, TN (US)

(73) Assignee: TRANE INTERNATIONAL INC., Davidson, NC (US)

( * ) Notice: Subject to any disclaimer, the term of this patent is extended or adjusted under 35 U.S.C. 154(b) by 533 days.

(21) Appl. No.: 16/926,401

(22) Filed: Jul. 10, 2020

(65) Prior Publication Data

US 2022/0010958 A1    Jan. 13, 2022

(51) Int. Cl.
*F23C 99/00*    (2006.01)
*F24D 5/02*    (2006.01)
(Continued)

(52) U.S. Cl.
CPC ............ *F23C 99/008* (2013.01); *F23D 14/04* (2013.01); *F23L 17/005* (2013.01); *F24D 5/02* (2013.01);
(Continued)

(58) Field of Classification Search
CPC .......... F23D 14/04; F23D 14/34; F23D 14/60; F24D 19/1084; F24D 5/02;
(Continued)

(56) References Cited

U.S. PATENT DOCUMENTS 2,671,503 A * 3/1954 Logan ..................... F23N 5/203
431/31
4,181,099 A * 1/1980 Binstock ................. F23N 1/042
122/448.1
(Continued)

FOREIGN PATENT DOCUMENTS

| JP | 11211015 A | 8/1999 |
| JP | 2009127879 A | 6/2009 |
| KR | 20070109541 A | 11/2007 |

*Primary Examiner* — Steven B McAllister
*Assistant Examiner* — Daniel E. Namay
(74) *Attorney, Agent, or Firm* — WOMBLE BOND DICKINSON (US) LLP

(57) ABSTRACT

Example furnaces and methods related thereto include a burner box including at least one burner configured to combust a fuel/air mixture. In addition, the furnace includes a first blower including an inlet nozzle having an air inlet and fuel inlet. The inlet nozzle is configured such that operation of the first blower is to pull air and fuel into the inlet nozzle to produce the fuel/air mixture at a fuel/air ratio that is configured to produce flue products having less than 14 Nano-grams per Joule of nitrogen oxides when combusted. Operation of the first blower is configured to push the fuel/air mixture into the burner box. Further, the furnace includes a heat exchanger assembly fluidly coupled to the burner box through a vestibule, and a second blower configured to pull the flue products through the heat exchanger assembly.

21 Claims, 12 Drawing Sheets

(51) Int. Cl.
*F23L 17/00* (2006.01)
*F23D 14/04* (2006.01)

(52) U.S. Cl.
CPC .... *F23K 2400/201* (2020.05); *F23N 2229/00* (2020.01); *F23N 2233/02* (2020.01); *F23N 2233/08* (2020.01); *F23N 2235/12* (2020.01)

(58) Field of Classification Search
CPC ......... F24D 2220/044; F24D 2220/046; F23N 1/04; F23N 1/042; F23N 1/045; F23N 1/047; F23N 2233/02; F23N 2233/08; F23N 2235/12; F23N 2229/00; F23N 2225/06; F23L 17/005; F23K 2400/201; F23C 7/008
USPC ........ 126/116, 112, 99 R, 110 C; 431/12, 16
IPC ............. F23D 14/02, 14/34, 14/60; F24D 5/02, 5/04, 19/10; F23C 7/00; F23N 1/02, 1/04
See application file for complete search history.

(56) References Cited

U.S. PATENT DOCUMENTS

| | | | |
|---|---|---|---|
| 4,471,753 A * | 9/1984 | Yates ........................ | F23L 5/00 126/76 |
| 4,867,673 A | 9/1989 | Harrigill | |
| 5,299,932 A | 4/1994 | Piver | |
| 6,004,129 A | 12/1999 | Carbone et al. | |
| 6,299,433 B1 | 10/2001 | Gauba et al. | |
| 6,318,358 B1 * | 11/2001 | Gatley, Jr. ........... | F04D 29/5806 126/110 R |
| 6,866,202 B2 | 3/2005 | Sigafus et al. | |
| 6,923,643 B2 | 8/2005 | Schultz et al. | |
| 8,616,194 B2 * | 12/2013 | Sherrow ................. | F24H 3/087 126/110 A |
| 9,188,362 B2 | 11/2015 | Potter, Sr. et al. | |
| 9,316,411 B2 | 4/2016 | Sherrow et al. | |
| 9,605,871 B2 | 3/2017 | Schultz et al. | |
| 9,970,679 B2 | 5/2018 | Noman et al. | |
| 2004/0230402 A1 | 11/2004 | St. Jean | |
| 2005/0227195 A1 * | 10/2005 | George ................... | F23D 14/64 431/352 |
| 2010/0291493 A1 * | 11/2010 | Jarry ...................... | G01N 25/18 431/12 |
| 2012/0037096 A1 * | 2/2012 | Watanabe ............... | F23L 11/02 431/75 |
| 2012/0178031 A1 | 7/2012 | Roy | |
| 2012/0247444 A1 * | 10/2012 | Sherrow ................. | F24H 3/087 165/104.34 |
| 2018/0340686 A1 * | 11/2018 | Lee .......................... | F23L 15/04 |
| 2019/0101308 A1 | 4/2019 | Perez et al. | |
| 2021/0123632 A1 | 4/2021 | Rodgers | |

\* cited by examiner

PUSH/PULL FURNACE AND METHODS RELATED THERETO

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

A furnace may provide heated air to a defined space, such as, for instance an internal space of a home, office, retail store, etc. Furnaces may transfer heat to a defined space via a number of different methods. In some instances, furnaces may combust a hydrocarbon fuel source, such as, for example, propane or natural gas, and then transfer the heat of the combustion process to heat an airflow that is circulated throughout the defined space. Specifically, in some of these furnaces, hot flue products resulting from the combustion process are flowed through one or more heat exchanger tubes, and an airflow is simultaneously flowed over the outer surfaces of the heat exchanger tubes so as to increase the temperature thereof.

BRIEF SUMMARY

Some embodiments disclosed herein are directed to a furnace. In an embodiment, the furnace includes a burner box including at least one burner that is configured to combust a fuel/air mixture. In addition, the furnace includes a first blower including an inlet nozzle having an air inlet and fuel inlet. The inlet nozzle is configured such that operation of the first blower is to pull air and fuel into the inlet nozzle via the air inlet and fuel inlet, respectively, to produce the fuel/air mixture at a fuel/air ratio that is configured to produce flue products having less than 14 Nanograms per Joule (ng/J) of nitrogen oxides ($NO_x$) when combusted in the at least one burner. Operation of the first blower is configured to push the fuel/air mixture into the burner box. Further, the furnace includes a heat exchanger assembly fluidly coupled to the burner box through a vestibule, and a second blower configured to pull the flue products through the heat exchanger assembly.

In some embodiments, the furnace includes a housing including first compartment and a second compartment separated by a vestibule. In addition, the furnace includes a combustion assembly disposed in the first compartment. The combustion assembly includes a first blower including an inlet nozzle having an air inlet and a fuel inlet, and a burner that is configured to receive a fuel/air mixture from the first blower. Further, the furnace includes a heat exchanger assembly. The heat exchanger assembly includes a heat exchanger disposed in the second compartment that is configured to receive flue products from the burner. In addition, the heat exchanger assembly includes a second blower fluidly coupled to the heat exchanger that is disposed within the first compartment. The second blower is configured to pull the flue products through the heat exchanger. Still further, the furnace includes a second blower fluidly coupled to the heat exchanger that is disposed within the first compartment. The second blower is configured to pull the flue products through the heat exchanger.

Other embodiments disclosed herein are directed to a method of operating a furnace. In an embodiment, the method includes pulling air into an air inlet of an inlet nozzle and fuel into a fuel inlet of the inlet nozzle with a first blower to form an fuel/air mixture at a fuel/air ratio. In addition, the method includes pushing the fuel/air mixture into a burner box with the first blower. Further, the method includes combusting the fuel/air mixture within a burner of the burner box to produce flue products having less than 14 ng/J of $NO_x$. Still further, the method includes pulling the flue products through a heat exchanger assembly with a second blower.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
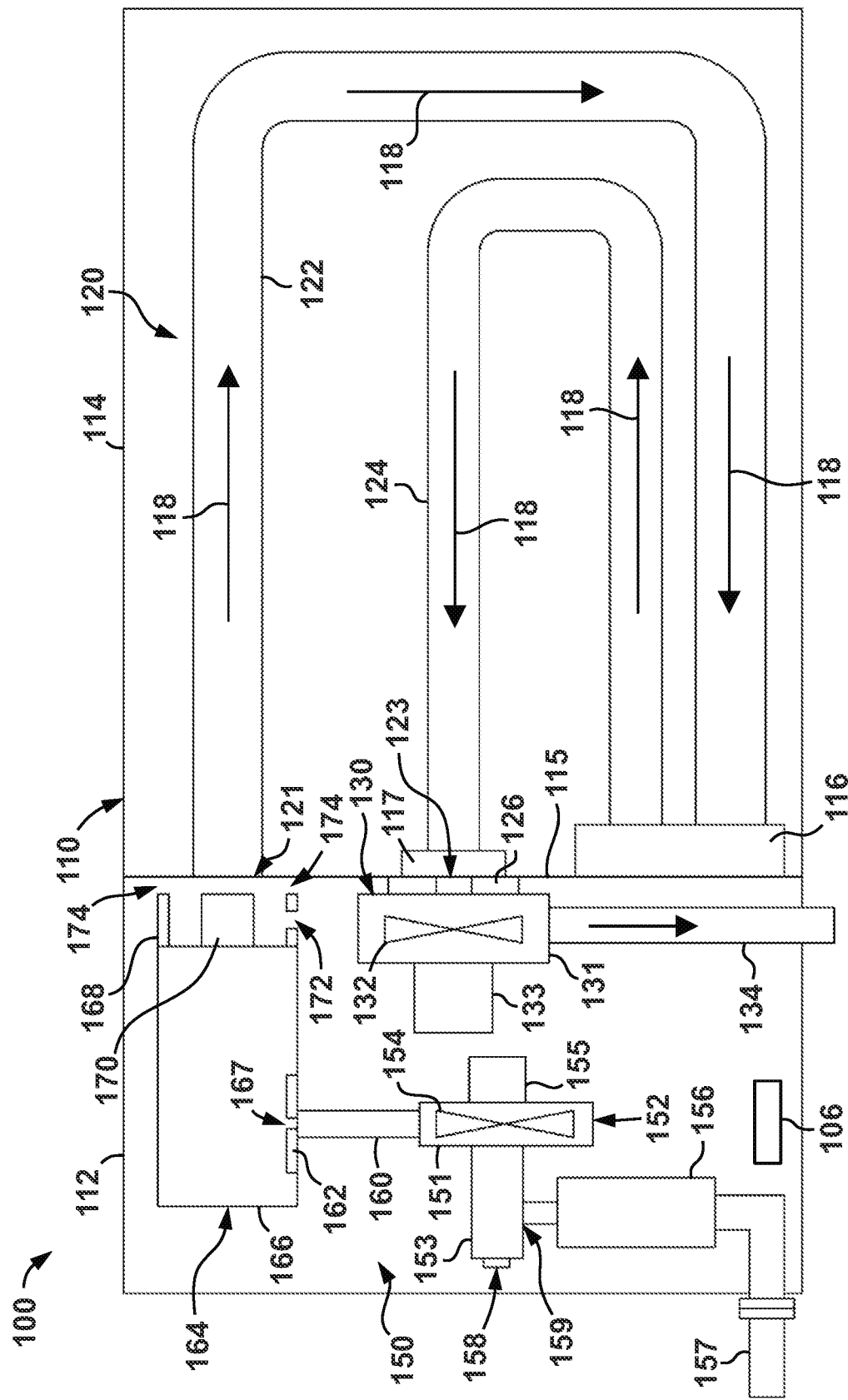
FIG. 1 is a schematic view of a furnace according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

As previously described, a furnace may heat an airflow within a heat exchanger using the flue products resulting from the combustion of a hydrocarbon fuel, and then deliver the heated airflow to a defined space. Upon exiting the heat exchanger, the flue products may be vented to the atmosphere. During these operations, the combustion of the hydrocarbon fuel may produce undesirable by-products in the flue products, such as $NO_x$. As used herein, "$NO_x$" refers to nitrogen oxides, such as, for instance, nitrogen dioxide and nitric oxide.

Without being limited to this or any other theory, utilizing a "rich" fuel/air ratio within a fuel/air mixture (i.e., a mixture containing a relatively high amount of fuel compared to the amount of combustion air) provided to the combustion process of the furnace may generate higher levels of $NO_x$ in the flue products. As a result, it may be desirable to maintain a lean fuel/air ratio within the fuel/air mixture provided to the combustion process so that $NO_x$ levels are reduced within the flue products. However, richer fuel/air mixtures are also typically associated with higher combustion temperatures, which may directly improve the operating efficiency of the furnace (e.g., since more enthalpy is transferred to the airflow within the heat exchanger as the combustion temperature increases). In addition, it can be difficult to maintain the combustion process if the proportion of fuel supplied to the furnace is reduced too severely.

Accordingly, embodiments disclosed herein include furnaces and associated methods of operation that provide a precise balance of the fuel/air ratio within the furnace in order to minimize $NO_x$ production, while still achieving reliable and stable combustion for delivering adequate heating capacity to the defined space. In some embodiments, the disclosed furnaces may be comprise a "push-pull" furnace that employs a first blower to "push" pressurized air and fuel to a burner box (where the air and fuel is combusted), and a second blower to "pull" the flue products resulting from the combustion through one or more heat exchanger tubes. In some embodiments, the furnaces of the embodiments disclosed herein may produce less than 14 Nano-grams per Joule (ng/J) of $NO_x$ during operation.

Referring now to FIG. 1, a schematic view of a furnace 100 according to some embodiments is shown. As generally noted above, furnace 100 may be utilized to heat an airflow that is circulated throughout a defined space (e.g., an interior of a home, office, retail store, etc.).

Furnace 100 generally includes a housing 110 that includes a plurality of chambers or compartments to house various components and assemblies of furnace 100. For instance, in the embodiment of FIG. 1, housing 110 includes a first compartment 112 and a second compartment 114 that are separated by an internal wall or vestibule 115. First compartment 112 encloses a combustion assembly 150 for combusting the hydrocarbon fuel during operations, and second compartment 114 encloses a heat exchanger assembly 120 for transferring heat from the combustion process in combustion assembly 150 to an airflow (not shown) that is then provided to the defined space (not shown). As a result, the first compartment 112 may be referred to herein as a combustion compartment 112, and the second compartment 114 may be referred to herein as a heat exchanger compartment 114.

Generally speaking, combustion assembly 150 is a premix combustion assembly whereby fuel and air are mixed at a desired fuel/air ratio before they are flowed to the burner(s) (e.g., see e.g., burner(s) 170) and then combusted. In particular, combustion assembly 150 includes a first or premix blower 152 and a burner box 164 downstream from the premix blower 152 (e.g., with respect to the flow of air and fuel within the combustion assembly 150).

Referring still to FIG. 1, premix blower 152 is coupled to an inlet nozzle 153 that includes a first or air inlet 158 and a second or fuel inlet 159. The air inlet 158 is coupled to a source of air, which in this embodiment comprises the available air disposed within the combustion compartment 112. In some embodiments, the air inlet 158 may draw air directly from the environment outside of the housing 110 of furnace 100 (e.g., via a snorkel or other suitable conduit). The fuel inlet 159 is coupled to a source 157 of fuel via a fuel valve 156. The source 157 may comprise a tank, pipe or other suitable storage or conveyance of hydrocarbon fuel. In some embodiments, the fuel comprises natural gas (e.g., a mixture of various hydrocarbons such as methane, ethane, etc.) that is delivered to the furnace 100 via a pipe (e.g., source 157).

The premix blower 152 may generally comprise a centrifugal blower comprising a blower housing 151, a blower impeller 154 at least partially disposed within the blower housing 151, and a blower motor 155 configured to selectively rotate the blower impeller 154. The premix blower 152 may generally be configured as a modulating and/or variable speed blower capable of being operated at many speeds over one or more ranges of speeds. In other embodiments, the premix blower 152 may be a single speed blower.

The blower motor 155 may comprise any suitable driver for rotating the impeller 154 within blower housing 151. For instance, in this embodiment, the blower motor 155 comprises an electric motor.

During operations, the premix blower 152 may be operated (e.g., by rotating the blower impeller 154) to draw in air and fuel via the inlets 158 and 159, respectively, of inlet nozzle 153. The air drawn into the inlet 158 may be referred to herein as "primary air." The fuel valve 156 may comprise a negative pressure regulator valve that opens in response to a sub-atmospheric pressure generated by the operation of the premix blower 152. In particular, in some embodiments, the inlet nozzle 153 may form a Venturi nozzle that creates a negative pressure at the fuel inlet 159 with a flow of air entering the inlet nozzle 153 via air inlet 158. During these operations, the fuel valve 156 may open according to the magnitude of the negative pressure created at the fuel inlet 159, which is in turn related to the flow rate of air into and through the inlet nozzle 153 via the air inlet 158. As a result, the flow rate of fuel into the inlet nozzle 153 via the fuel inlet 159 may be proportional to the flow rate of air into the inlet nozzle 153 via the air inlet 158. Therefore, the size, shape, and other parameters of the inlets 158, 159, inlet nozzle 153, fuel valve 156, etc. may be chosen so as to produce a desired fuel/air ratio for limiting or minimizing the production of $NO_x$ during combustion.

More particular, in some embodiments, the inlets 158, 159, inlet nozzle 153, fuel valve 156, etc. may be configured to provide more than a Stoichiometric amount of air needed to combust all of the fuel (e.g., fuel flowing from source 157) that is provided to burner box 164 during operations, so that a resulting air/fuel mixture emitted from the premix blower 152 and provided to burner box 164 may be "lean" with respect to the volume of fuel included therein. In some embodiments, the inlets 158, 159, inlet nozzle 153, fuel valve 156, etc. may be configured to provide approximately 20-30 vol. % of air, or 27-30 vol. % of air in the air/fuel mixture. Without being limited to this or any other theory and as generally described above, a lean air/fuel mixture may produce a generally lower flame temperature, which may reduce a heating performance of the furnace 100, but may also produce lower levels of $NO_x$. As a result, the inlets 158, 159, inlet nozzle 153 and fuel valve 156, etc. may be configured to strike a balance between sufficiently high flame temperature for occupant comfort and furnace efficiency, but while maintaining $NO_x$ emissions below an upper limit (e.g., such as 14 ng/J as previously described above). In some embodiments, the target flame temperature within the burners (e.g., burners 170) of burner box 164 is about 1900 to 2100° F., or about 1950 to 2100° F. so as to achieve this balance.

In some embodiments, the inlet nozzle 153 may expand the inner diameter when moving downstream from the air inlet 158 to premix blower 152 so as to generate a sufficient negative pressure to draw a desired amount of fuel through the fuel inlet 159 (and therefore result in the desired fuel/air ratio as mentioned above). For instance, in some embodiments, the diameter of the air inlet 158 in inlet nozzle 153 may range from about 0.50 inches to about 1.50 inches, or from about 0.75 to about 1.10 inches, and the inlet nozzle 153 may include an outlet (not specifically shown) that communicates the air and fuel with the premix blower 152 that has a diameter of about 1.25 inches to about 1.50 inches, or from about 1.30 inches to about 1.50 inches. In some specific embodiments, the diameter of the air inlet 158 may be about 0.75 inches and the diameter of the outlet of inlet nozzle 153 may be about 1.34 inches. In some specific embodiments, the diameter of the air inlet 158 may be about 1.10 inches and the diameter of the outlet of inlet nozzle 153 may be about 1.45 inches.

Because the flow rate of fuel into the inlet 159 and thus into the premix blower 152 is proportional to the flow rate of air flowing with inlet 158, the fuel/air ratio may be maintained regardless of the operating speed of the blower 152 (e.g., such as in embodiments where the premix blower 152 is a variable speed blower as previously described above). As the air and fuel flow into and within the inlet nozzle 153 and blower housing 151 of premix blower 152, they are sufficiently agitated so as to form a fuel/air mixture that is then emitted from the blower housing 151 into the burner box 164 via a conduit 160.

Referring still to FIG. 1, burner box 164 generally includes a chamber 166 and one or more burners 170 fluidly coupled to chamber 166. The burner(s) 170 are partially enclosed by a housing 168 that is coupled to the vestibule 115. Generally speaking, the fuel/air mixture is provided to an inlet 167 of the chamber 166 via the flow conduit 160, and is then communicated from the chamber 166 to the one or more burners 170 wherein the fuel/air mixture is combusted to produce flue products. Thereafter, the hot flue products are emitted from the burners and flowed into the heat exchanger assembly 120.

The inlet 167 into chamber 166 may be at least partially formed by an orifice plate 162 that is disposed between the flow conduit 160 and the chamber 166 so as to adjust the pressure of the fuel/air mixture entering the chamber 166 during operations. Without being limited to this or any other theory, the pressure of the fuel/air mixture entering the chamber 166 may be set or adjusted (e.g., via the orifice plate 162) such that the fuel/air mixture fills the chamber 166 and flows generally evenly to the one or more burners 170. In addition, the pressure of the fuel/air mixture within chamber 166 may be set or adjusted (e.g., again, via the orifice plate 162) so as to provide an appropriate flow rate through burner(s) 170 so as to avoid flame lift-off during operations. In some embodiments, the pressure of the fuel/air mixture within the chamber 166 may be about 3.5 inches of water. The size of the orifice plate 162 to achieve the desired pressure of the fuel/air mixture within chamber 166 will depend on various factors such as, for instance, the size of the chamber 166, the speed of the premix blower 152, the length and size of the flow conduit 160, the number, size, and arrangement of the burners 170, etc. In some embodiments, the orifice plate 162 is omitted.

In some embodiments, the orifice plate 162 may provide central aperture or hole size of between 0.5 and 1.5 inches. For instance, in some embodiments, the orifice plate 162 may have a central aperture size of about 0.75 inches. In some embodiments, the orifice plate 162 may have a central aperture size of about 0.90 inches or 1.10 inches.

The housing 168 may include one or more ports or openings to allow a flow of secondary air into the housing 168 and therefore mix with the combusted (or partially combusted) fuel/air mixture that is emitted from the burner(s) 170. For instance, the housing 168 (or a portion thereof) may be spaced from the vestibule 115 so as to form a gap 174 therebetween. In addition, in some embodiments, additional ports 172 may also be formed in the wall of housing 168. The ports 172 may be disposed along a side of the housing 168 that faces inward, and generally toward a center of the combustion compartment 112. During operations, secondary air is drawn into the housing 168 via the gap 174 (and the ports 172, if present), and then mixes with the combusted (or partially combusted) fluid flowing out (and thus downstream) from the burner(s) 170 and into the heat exchanger assembly 120.

Without being limited to this or any other theory, the flow of secondary air may help to complete the combustion of any hydrocarbon fuel that was not combusted within the burner(s) 170. In addition, the secondary air entering at the gap 174 (and the ports 172, if present) may form an insulating barrier between the walls of the heat exchanger tube(s) of heat exchanger assembly 120 (discussed in more detail below) and the hot combustion products within the inlet of the heat exchanger, such that the heat exchanger tubes are protected from the relatively high initial temperature generated via the combustion process.

The size of the gap 174 (and the ports 172, if present) may be chosen to provide a desired flow rate of secondary air during operations, and therefore may be set or adjusted based on a variety of factors such as, for instance, the number, size, and arrangement of the burner(s) 170, the flow rate of the fuel/air mixture, etc.

Referring still to FIG. 1, heat exchanger assembly 120 includes one or more heat exchanger tubes that are configured to receive the hot flue products produced from the combustion within burner(s) 170 of combustion assembly 150. In particular, in this embodiment, heat exchanger assembly 120 includes one or more primary heat exchanger tubes 122 and one or more a secondary heat exchanger tubes 124. The primary heat exchanger tube(s) 122 include inlet(s) 121 that form a general inlet for the heat exchanger assembly 120 and the secondary heat exchanger tube(s) 124 include outlet(s) 123 that form a general outlet for the heat exchanger assembly 120. Between the inlet(s) 121 and outlet(s) 123, the primary heat exchanger tubes 122 are coupled to the secondary heat exchanger tube(s) 124 via a hot header 116. Inlet(s) 121 is/are generally fluidly coupled to the burner(s) 170 through the vestibule 115, and the outlet(s) 123 is/are fluidly coupled to combustion blower 130 via a cold header 117. In this embodiment, the combustion blower 130 is disposed within the combustion compartment 112 along with the combustion assembly 150 so that the combustion products are communicated from the cold header 117, through the vestibule 115, into the combustion blower 130.

The combustion blower 130 may generally comprise a centrifugal blower comprising a blower housing 131, a blower impeller 132 at least partially disposed within the blower housing 131, and a blower motor 133 configured to selectively rotate the blower impeller 132. The combustion blower 130 may generally be configured as a modulating and/or variable speed blower capable of being operated at many speeds over one or more ranges of speeds. In other embodiments, the combustion blower 130 may be a single speed blower. The blower motor 133 may comprise any suitable driver for rotating the impeller 154 within blower housing 131. For instance, in this embodiment, the blower motor 133 comprises an electric motor.

Generally speaking, during operations, once flue products emitted from burner(s) 170 enter the inlet(s) 121 of the primary heat exchanger tube(s) 122, they are pulled through the primary heat exchanger tube(s) 122, the hot header 116, and the secondary heat exchanger tube(s) 124 to the outlet(s) 123 and cold header 117 by the combustion blower 130. The combustion blower 130 then emits the flue products to a flue pipe 134 for conveyance to the outside environment. The arrows 118 in FIG. 1 generally depict the flow path of flue products within the heat exchanger assembly 120 as generally described above. As the flue products are flowed through the primary heat exchanger tube(s) 122 and the secondary heat exchanger tube(s) 124, an airflow (not shown in FIG. 1, but see e.g., airflow 182 in FIG. 3) is directed over the outer surfaces of the heat exchanger tubes 122, 124 so that heat is transferred from the flue products to the airflow.

An orifice plate 126 may be disposed between the cold header 117 and the combustion blower 130. Without being limited to this or any other theory, the orifice plate 126 may produce a backpressure within the cold header 117 and secondary heat exchanger tube(s) 124 that is to generally slow the flow rate of the hot flue products within the heat exchanger assembly 120 and therefore promote additional heat transfer from the flue products to the airflow outside of the heat exchanger tubes 122, 124 during operations.

Referring still to FIG. 1, an auxiliary heater 106 may be disposed within the combustion compartment 112. During operations, auxiliary heater 106 may generate heat that is radiated within the combustion compartment 112. In some circumstances, the furnace 100 is intended for installation in an outdoor environment. When installed outdoors, the ambient temperature surrounding the furnace 100 may fall below an acceptable level for operating one or more components within the combustion compartment 112 (e.g., such as the blowers 152, 130 and particularly motors 155, 133). Therefore, if the furnace 100 has not been operating for an extended period, the temperature within the combustion compartment 112 may fall below the threshold temperature. To prevent combustion compartments temperature falling below a threshold temperature, auxiliary heater 106 may be utilized so as to maintain the temperature within the combustion compartment above a predetermined minimum (e.g., −4° F. in some embodiments) such that operation of the various components within combustion compartment 112 (e.g., again, such as blowers 152, 130) may be immediately initiated upon receipt of a call for heat within the defined space. In some embodiments, auxiliary heater 106 may comprise a resistive heater that generates heat via one or more electrically resistive coils when they are energized with electrical current. In some embodiments, furnace 100 may include a low temperature governor that may prevent operation of the furnace if the temperature surrounding the furnace 100 and/or within the combustion compartment 112 should fall below a predetermined minimum value.

Figure 2:
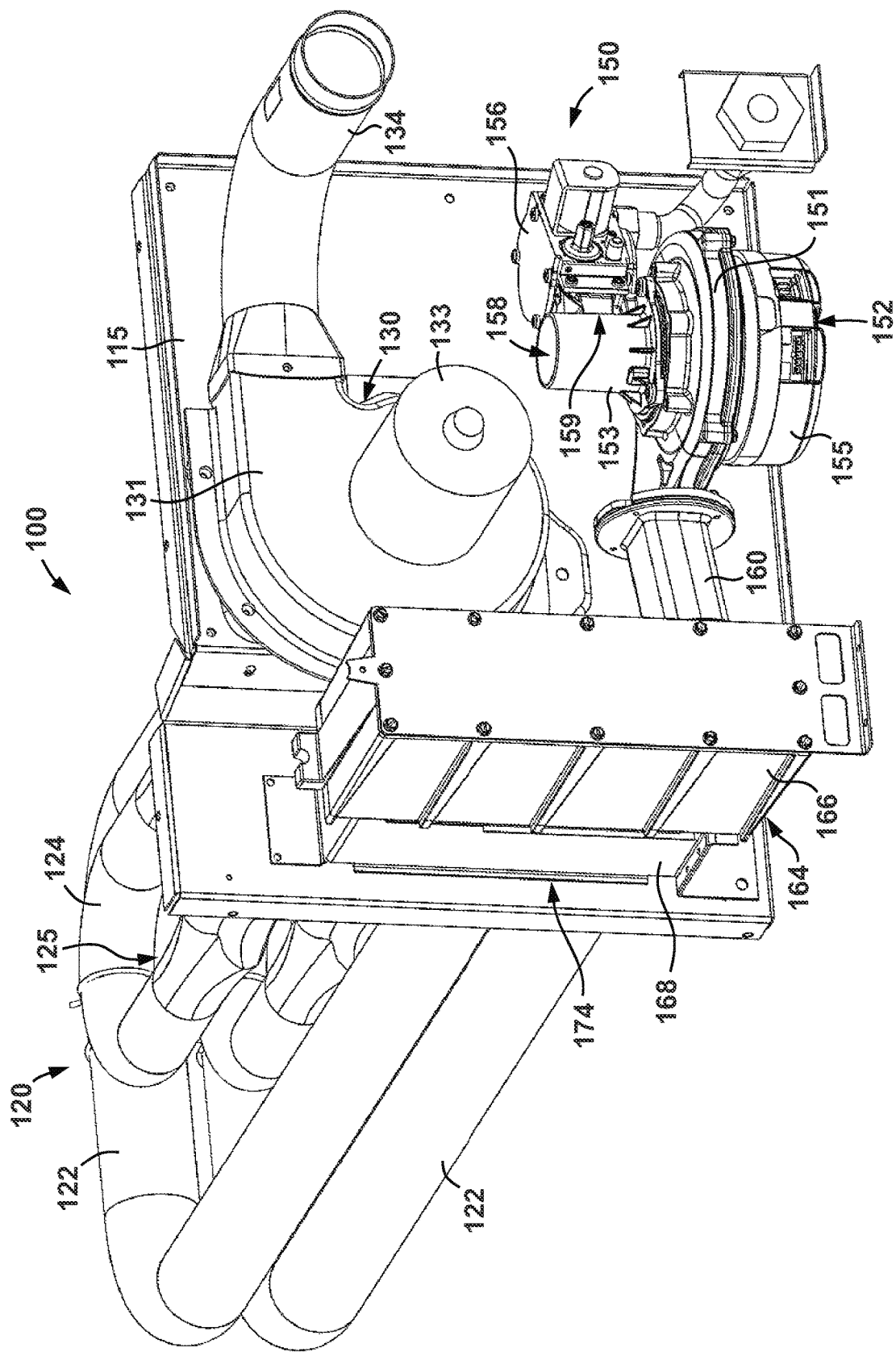
FIG. 2 is a perspective view of the furnace of FIG. 1 according to some embodiments.
Figure 3:
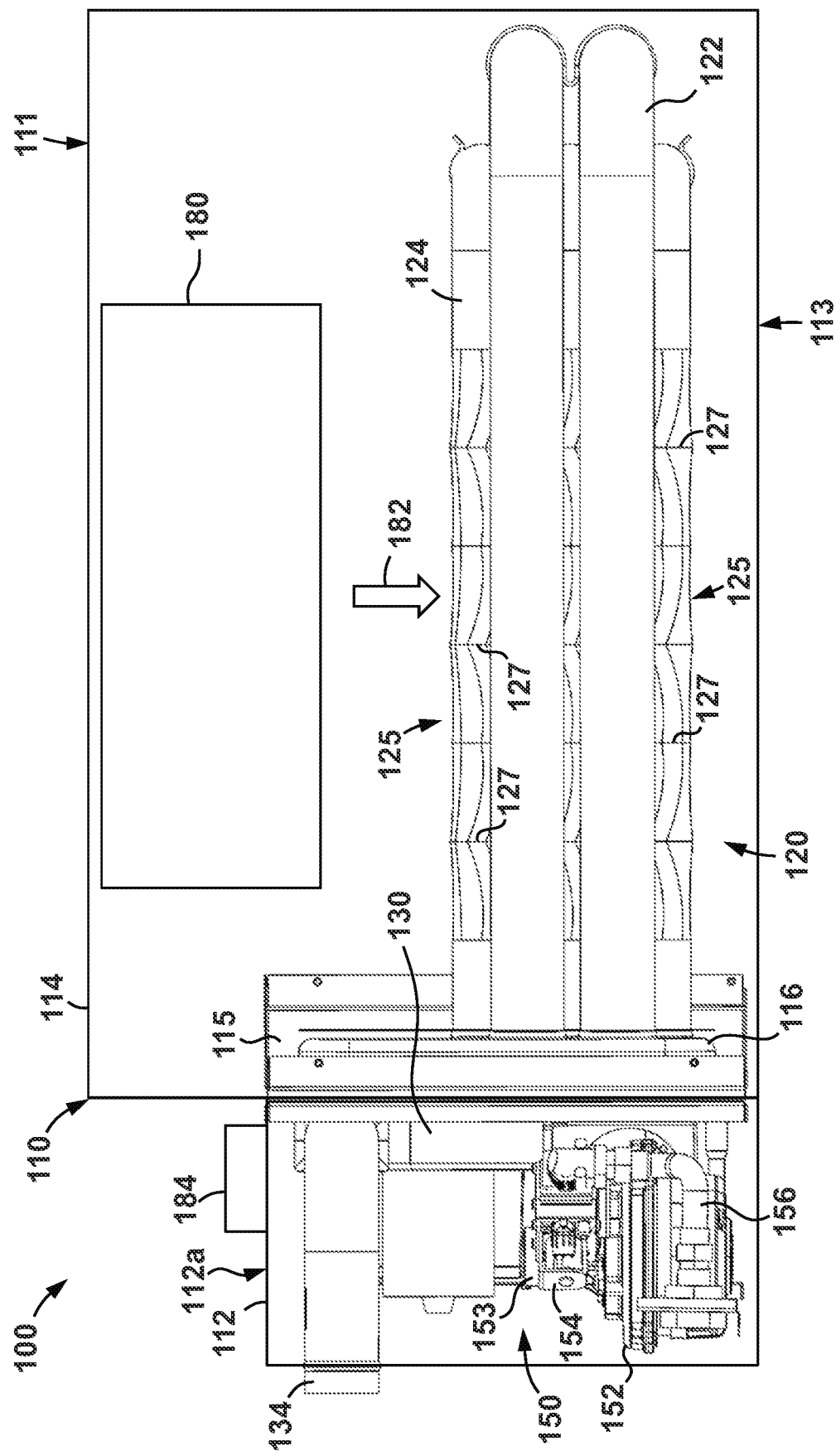
FIG. 3 is a side, schematic view of the furnace of FIG. 1 according to some embodiments.
Figure 4:
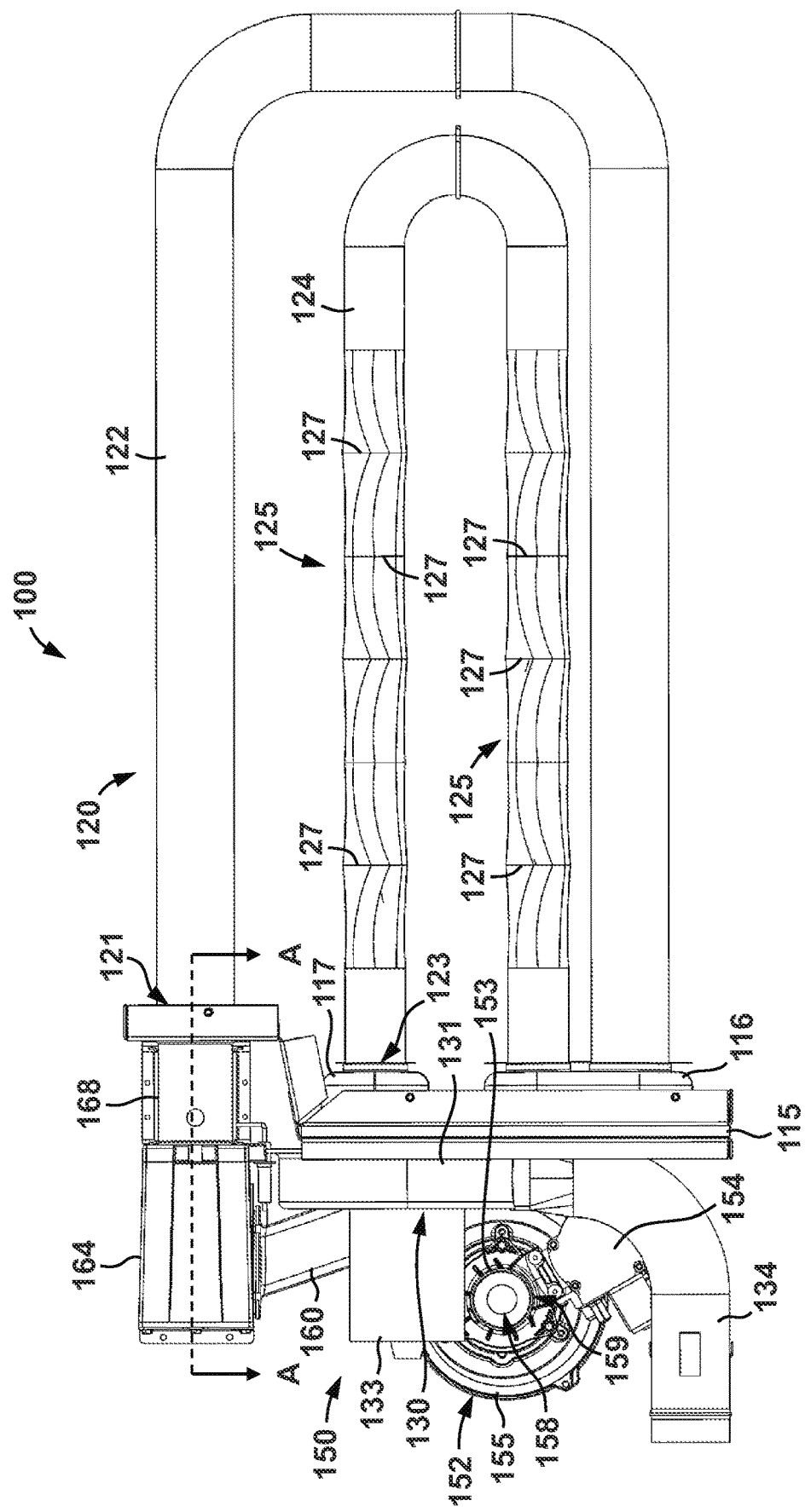
FIG. 4 is a top view of the furnace of FIG. 1 according to some embodiments.

Referring generally now to FIGS. 2-4, more particular depictions of furnace 100 of FIG. 1 are shown so as to show the relative arrangement of the various components described above according to some embodiments. It should be noted that FIGS. 2 and 4 generally omit the housing 110 (except for the vestibule 115) so as to best show the various components of the combustion assembly 150 and heat exchanger assembly 120. However, FIG. 3 provides a schematic representation of housing 110 about combustion assembly 150 and heat exchanger assembly 120.

Referring specifically to FIG. 3, a circulation blower 180 is disposed within the heat exchanger compartment 114 along with the heat exchanger assembly 120. During operations, the circulation blower 180 may generate an airflow 182 that is directed over the heat exchanger tubes 122, 124, so that heat may be transferred from the heat exchanger tubes 122, 124 to the airflow 182 as previously described above. In this embodiment, the furnace 100 is arranged in a so-called "downflow orientation" such that the airflow 182 is emitted out of bottom side 113 of the heat exchanger compartment 114 after flowing over the heat exchanger tubes 122, 124. In other embodiments, the furnace 100 may be arranged to emit the airflow 182 out of a top side 111 of the heat exchanger compartment 114 (such that the furnace 100 is in a so-called "upflow orientation"), or may be arranged to emit the airflow 182 out of a side surface of the heat exchanger compartment 114 (such that the furnace 100 is in a so-called "side-flow orientation"). In this embodiment, the circulation blower 180 is configured to emit and force the airflow 182 over the heat exchanger tubes 122, 124, and thus, circulation blower 180 is disposed above the heat exchanger tubes 122, 124 within the heat exchanger compartment 114 so as to produce the downflow orientation previously described above. However, in other embodiments, the circulation blower 180 may be configured to draw or pull the airflow 182 over the heat exchanger tubes 122, 124 (and thus may be disposed below the heat exchanger tubes 122, 124 within heat exchanger compartment 114 so as to produce the downflow orientation previously described above).

In addition, as is also shown in FIG. 3, the furnace 100 may include an electrical switch assembly 184 that includes one or more switches for energizing one or more of the blower motors 155, 133, and/or the blower motor (not shown) of the circulation blower 180. In this embodiment, the electrical switch assembly 184 is disposed along an upper surface or top 112a of the combustion compartment 112. Without being limited to this or any other theory, placement of the electrical switch assembly 184 outside of the combustion compartment 112 may shield the electrical switch assembly 184 from the heat generated within the burner box 164 (e.g., within burners 170) during operations.

Referring specifically to FIG. 4, generally speaking, the primary heat exchanger tubes 122, 124 may be round in cross-section. However, portions of the secondary heat exchanger tubes 124 may comprise elliptical or oval sections 125 that may include one or more indentations or crimps 127. Without being limited to this or any other theory, the elliptical sections 125 may reduce a projected cross-sectional area of the secondary heat exchanger tubes 124 so as to reduce a pressure drop for the airflow 182 (FIG. 3) flowing across the heat exchanger tubes 122, 124 during operations. In addition, the one or more indentations 127 may induce turbulence within the flue products flowing with the secondary heat exchanger tubes 124 so as to promote mixing of the flue products and enhance heat transfer from the flue products to the airflow (see e.g., airflow 182 in FIG. 3) outside of heat exchanger tubes 122, 124.

In addition, as also shown in FIG. 4, in this embodiment the primary heat exchanger tubes 122 are generally arranged or wrapped about the secondary heat exchanger tubes 124. As a result, the secondary heat exchanger tubes 124 are disposed within the primary heat exchanger tubes 122.

Figure 5:
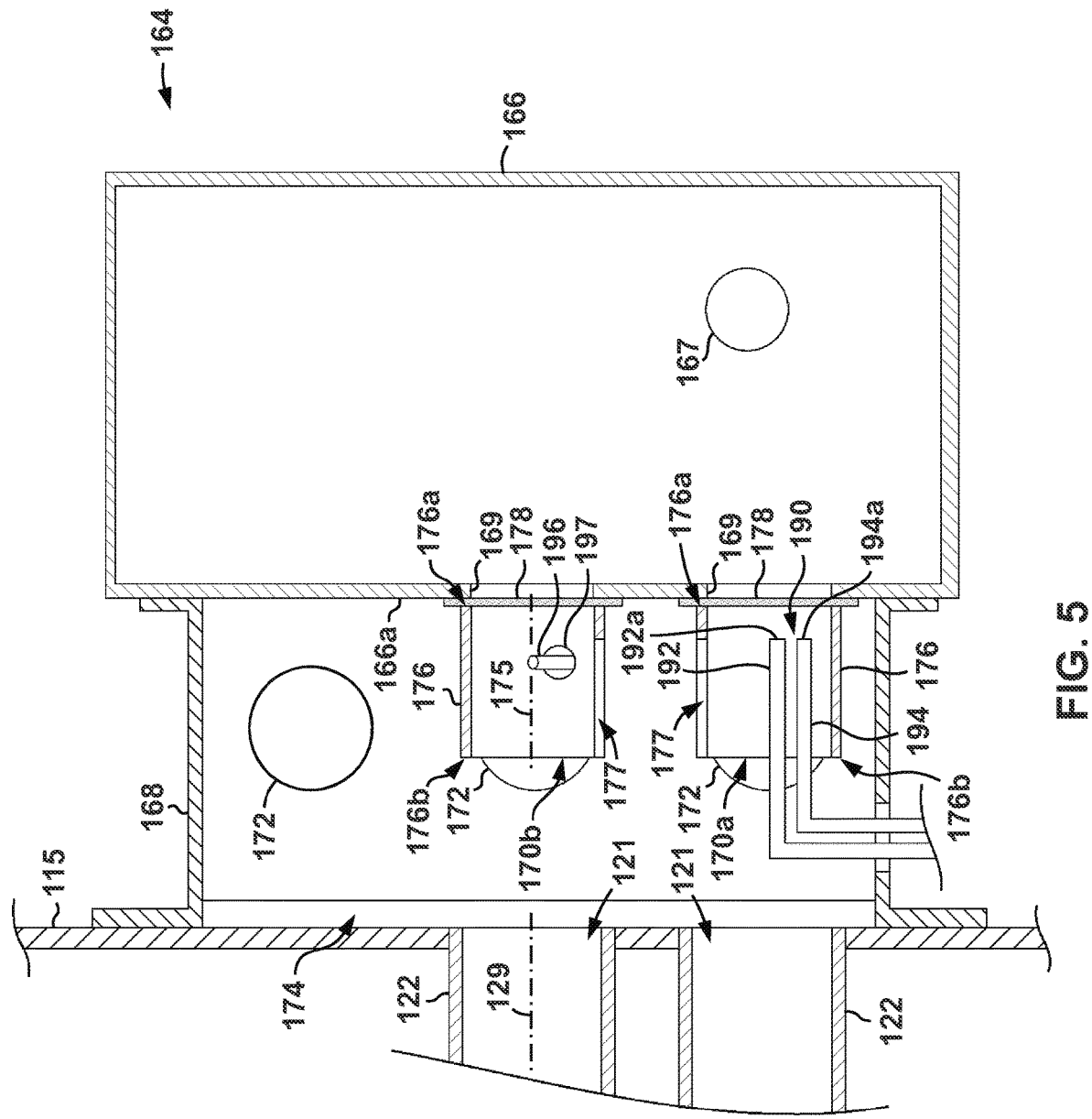
FIG. 5 is a cross-sectional view taken along section A-A in FIG. 4 showing the burner box of the furnace of FIG. 1 according to some embodiments.

Referring now to FIG. 5, a cross-section along section A-A is shown so as to further illustrate the components of the burner box 164. In this embodiment, burner box includes two burners 170 fluidly coupled to chamber 166 via a pair of ports or apertures 169. In particular, burner box 164 includes a first burner 170a and a second burner 170b. In this embodiment, the first burner 170a is disposed vertically below the second burner 170b.

Each burner 170a, 170b includes a burner housing 176 that is disposed within the housing 168 and coupled about a corresponding one of the ports 169. In this embodiment, the burner housings 176 are hollow cylindrical members that each include a central axis 175, a first or inner end 176a, and a second or outer end 176b opposite first end 176a. Inner ends 176a are engaged with an outer wall 166a of chamber 166 about the corresponding ports 169 such that second ends 176b project outward or away from outer surface 166a along the corresponding axis 175. Note—FIG. 5 only depicts the axis 175 of the burner housing 176 of second burner 170b so as to simplify the drawing.

Each burner 170a, 170b is generally aligned with a corresponding opening or inlet 121 of one of the primary heat exchanger tubes 122. Because there are a total of two burners 170a, 170b in this embodiment, there are two corresponding primary heat exchanger tubes 122 that are generally aligned with the burners 170a, 170b. In particular, ports 169 in chamber 166 are generally aligned with the openings of primary heat exchanger tubes 122 such that the axes 175 of burner housings 176 are generally aligned with the central axes 129 of the corresponding primary heat exchanger tubes 122 when housings 176 are coupled to outer surface 166a of chamber 166 about ports 169 as shown in FIG. 5.

A burner medium 178 is disposed between the inner ends 176a of the burner housing 176 and the chamber 166. The burner medium 178 may comprise a porous material (e.g., a knitted material, mesh, etc.) that is generally allows the fuel/air mixture to flow therethrough. Without being limited to this or any other theory, flowing the fuel/air mixture through the burner medium 178 may slow the velocity of the fuel/air mixture as it flows from chamber 166 into the burner housings 176, and may generally promote even distribution of the fuel/air mixture into the burner housings 176 during operations.

An ignition assembly 190 is disposed within the burner housing 176 of first burner 170a. In this embodiment, ignition assembly 190 comprises a direct spark-type igniter that is configured to ignite the fuel/air mixture by emitting an electrical arc or spark between two electrodes. In particular, as shown in FIG. 5, ignition assembly 190 comprises a first electrode 192 and a second electrode 194 extending into burner housing 176 of first burner 170a. Each electrode 192, 194 may include a distal or terminal tip 192a, 194a, respectively, and may be arranged within burner housing 176 of first burner 170a. In some embodiments, terminal tips 192a, 194a may be arranged within burner housing 176 of first burner 170a such that the distal tips 192a, 194a are more proximate to the inner end 176a than outer end 176b of burner housing 176. However, in various embodiments terminal tips 192a, 194a may be disposed at any position or depth within burner housing 176 of first burner 170a (e.g., such as at a position more proximate outer end 176b than inner end 176a, or a position substantially equidistant between ends 176a, 176b).

While not specifically shown in FIG. 5, it should be appreciated that electrodes 192, 194 may each generally be surrounded in an electrically insulating material, except for the distal tips 192a, 194a and/or a portion or section of the electrodes 192, 194 that includes the tips 192a, 194a. The electrically insulating material may be configured to withstand the relatively high temperature of the flames formed within the burner housing 176 without melting, burning, etc.

During operations, one of the electrodes 192, 194 may be energized with electrical current, while the other of the electrodes 192, 194 may be generally electrically coupled to an electrical ground. As a result, an electrical discharge, such as an arc or spark may form between the electrodes 192, 194. Due to the electrical insulating material surrounding most of the electrodes 192, 194 as described above, the electric discharge occurs at or proximate to the distal tips 192a, 194a which are disposed within the burner housing 176, proximate to the inner end 176a as previously described. Because the concentration of fuel/air mixture may be generally greater closer to the inner ends 176a and ports 169 of chamber 166, the generation of a spark (e.g., at distal tips 192a, 194a) at a location that is generally proximate to the inner end 176a of burner housing 176 of first burner 170a may promote a more reliable ignition of the fuel/air mixture during operations.

In some embodiments, the ignition assembly 190 may comprise another type or design of igniter, other than a direct spark igniter. For instance, in some embodiments, the ignition assembly 190 may comprise a hot surface igniter that initiates combustion by heating a surface (e.g., with electric current) that is exposed to the fuel/air mixture. Upon contacting the hot surface, the fuel/air mixture is ignited so as to initiate combustion thereof. Without being limited to this or any other theory, the direct spark-type igniter disclosed above for ignition assembly 190 may provide a more robust system compared with a hot surface igniter due to the generally more substantial construction of electrodes 192, 194 as compared to some designs of a hot surface type igniter. As a result, use of a direct-spark type ignition assembly 190 may help to ensure more reliable ignition operations throughout the life of furnace 100.

Referring still to FIG. 5, burner housing 176 may include one or more notches or apertures 177 so as to promote flame propagation across each of the burners 170a, 170b during operations. In particular, in this embodiment, the burner housing 176 of first burner 170a includes a notch 177 on a side facing (or most proximate to) the burner housing 176 of second burner 170b. In addition, the burner housing 176 of second burner 170b includes a notch 177 on a side facing (or most proximate to) the burner housing 176 of first burner 170a. Thus, the notches 177 may provide an open flow path that extends in a radial direction between the axes 175 of the burner housings 176. During operations, notches 177 in burner housings 176 may allow flames to propagate between the first burner 170a and second burner 170b. In particular, during an initial ignition of the burners 170a, 170b, combustion may initiate within the burner housing 176 of the first burner 170a (e.g., as a result of the spark formed between the electrodes 192, 194 as previously described), and then may propagate to the burner housing 176 of the second burner 170b via the aligned notches 177 so as to then ignite the second burner 170b. In addition, following initial ignition of the burners 170a, 170b, the aligned notches 177 may allow flame to propagate between the burner housings 176 in the event that flames are lost in one of the burners 170a, 170b. Each notch 177 may generally be rectangular in shape and extend axially from the outer ends 176b of burner housings 176 toward the inner ends 176a (with respect to the corresponding axes 175 of burner housings 176); however, other shapes and designs of notches 177 are contemplated herein.

Second burner 170b may include a flame rod sensor 196 disposed within the burner housing 176. The flame rod sensor 196 may comprise an elongate electrically conductive rod that is inserted through an aperture 197 in the wall of burner housing 176 of second burner 170b. In some embodiments, the flame rod sensor 196 may extend into burner housing 176 (e.g., via aperture 197) along a generally radial direction with respect to axis 175 of burner housing 176 of second burner 170b. During operations, the flame rod 196 may sense electrical current that is conducted through the flames formed within the burners 170a, 170b. In some embodiments, and electrical current may be conducted through the flames in burners 170a, 170b from one of the electrodes 192, 194 of ignition assembly 190. Because flame rod 196 is inserted within the burner housing 176 of the second burner 170b, the flame rod sensor 196 may essentially detect whether flame has fully propagated from the first burner 170a to the second burner 170b (e.g., via the flow path formed by the aligned notches 177 as previously described above). Accordingly, if flame is detected in the second burner 170b via the flame rod sensor 196, then it may be assumed that flame is also present within the first burner 170a. Conversely, if flame is not detected in the second burner 170b via the flame rod sensor 196, then it may be presumed that either flame has not propagated to the second burner 170b from first burner 170a and/or that flames are not present in either of the burners 170a, 170b.

In addition, without being limited to this or any other theory, placement of the flame rod sensor 196 within the burner housing 176 may also provide an early indication of an upset in the combustion process within burner box 164. Specifically, because combustion is initiated within the burner housings 176 as previously described above, any upsets (e.g., interruptions in fuel and/or air supply from premix blower 152) will cause a loss of flame within the burner housings 176 first (e.g., particularly close to the burner medium 178). Therefore, placing the flame rod sensor 196 within the burner housing 176 may allow flame rod sensor 196 to detect (e.g., via loss of flame) an upset to the combustion process relatively quickly, thereby allowing remediation measures to be taken before damage or other negative consequences occur. For instance, as will be described in more detail below, the placement of the flame rod sensor 196 within the burner housing 176 may enhance an ability of a controller assembly (e.g., controller assembly 250 described in more detail below) of furnace 100 to detect a blockage in the air inlet 158 of inlet nozzle 153 because flame rod sensor 196 is positioned to detect the resulting upset to the combustion process relatively quickly.

Referring still to FIG. 5, during operations, fuel/air mixture is provided to the chamber 166 via inlet 167 from the premix blower 152 and conduit 160 as previously described above (see e.g., FIG. 1). The fuel/air mixture may generally fill the chamber 166 and flow out through the ports 169 into the burner housings 176 of burners 170a, 170b, where the fuel/air mixture is ignited (e.g., initially by ignition assembly 190) so that flames are produced that flow along axes 175 of burner housings 176 toward inlets 121 of primary heat exchanger tubes 122 (note: the flames produced within burner housings 176 may not fully extend to inlets 121, and may be fully contained within burner housings 176 themselves). During this process, secondary air is drawn into the housing 168 through the gap 174 as well as the apertures 172. This secondary air is generally shielded from the interior of the burner housings 176 and mixes with the combusted (or partially combusted) fuel/air mixture downstream of the outer ends 176b of burner housings 176 so as to complete the combustion of any fuel that was not combusted within the burner housings 176 and to insulate the walls of the primary heat exchanger tubes 122 proximate the inlets 121 as previously described above.

Figure 6:
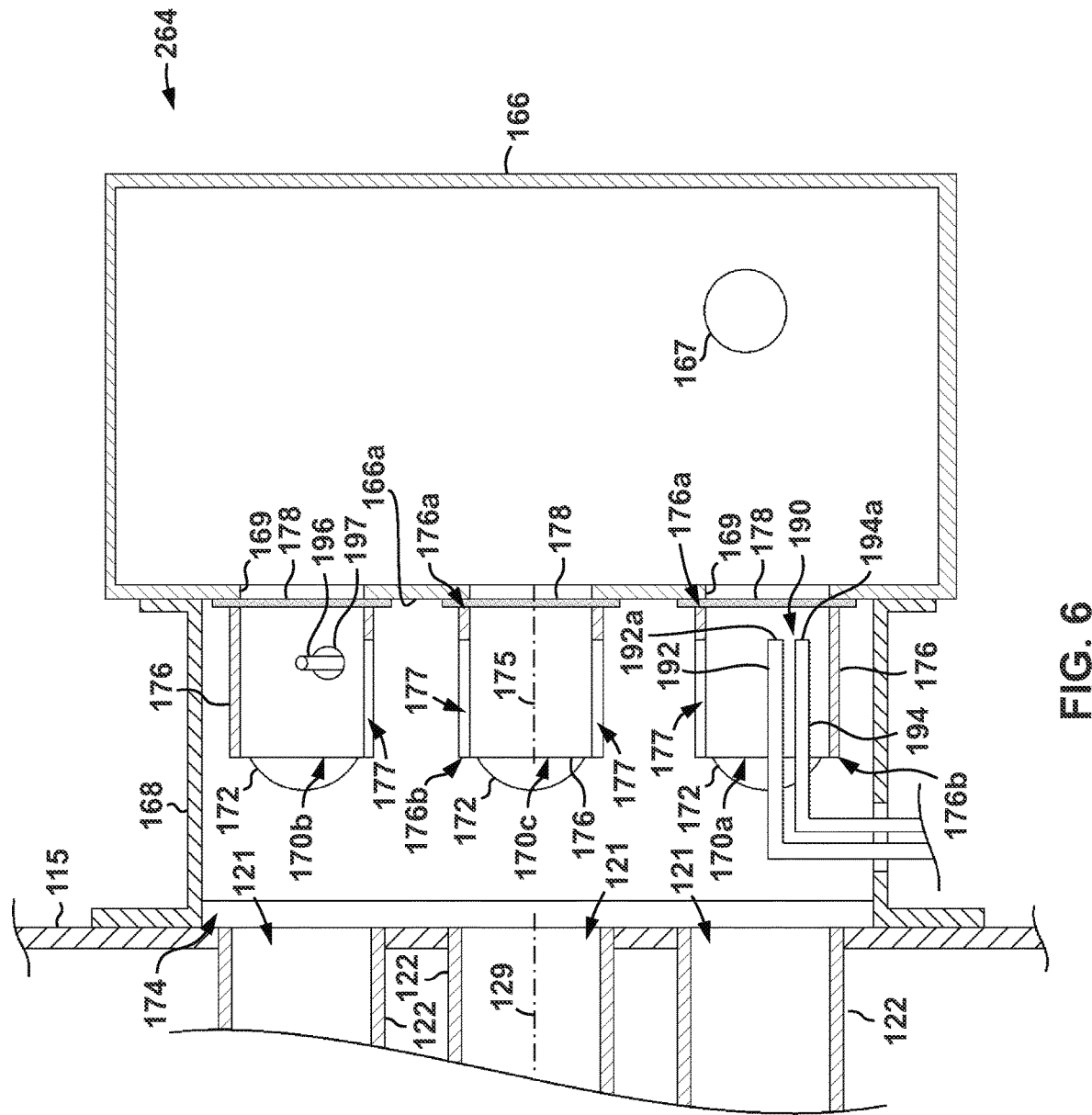
FIG. 6 is a cross-sectional view of another burner box that may be used within the furnace of FIG. 1 according to some embodiments.

While the burner box 164 shown in FIG. 5 includes two burners 170a, 170b, it should be appreciated that different numbers of burners 170 may be included within the housing 168 in other embodiments. For instance, reference is now made to FIG. 6 which shows a burner box 264 that may be utilized within the furnace 100 in place of burner box 164 previously described. In describing the features of burner box 264, the same reference numerals are used to designate features of the burner box 264 that are the same as the burner box 164, and the description below will focus on the features of burner box 264 that are different form the burner box 164.

In particular, burner box 264 is generally the same as burner box 164 except that a third burner 170c is disposed between the first burner 170a and second burner 170b along outer surface 166a of chamber 166 so that burner box 264 includes a total of three burners. The spacing between the burners 170a, 170b is adjusted so that third burner 170c may fit between the burners 170a, 170b. An additional primary heat exchanger tube 122 is coupled to the vestibule 115 and aligned with the axis 115 of the burner housing 176 of third burner 170c so as to receive the combusted fuel/air mixture from third burner 170c in the same manner described above for the primary heat exchanger tubes 122 aligned with the burners 170a, 170b.

In addition, the burner housing 176 of third burner 170c includes a pair of notches 177 that are disposed radially opposite one another about axis 175 and that are generally proximate and aligned with the corresponding notches 177 in the burner housings 176 of first burner 170a and second burner 170b as previously described above. As a result, the notches 177 of burner housings 176 of burners 170a, 170b, 170c may again form a flow path that extends in a radial direction between the burners 170a, 170b, 170c with respect to the axes 175, so that flames that originate within the first burner 170a may propagate to the third burner 170c, and finally to the second burner 170b via the notches 177.

Operations with the burner box 264 are generally the same as previously described above for the burner box 164, and therefore are not generally repeated herein in the interest of brevity. However, it should be appreciated that the fuel/air mixture within the chamber 166 flows out of all three burners 170a, 170b, 170c which may generally increase the amount of heat generated within the burner box 264 as compared to the burner box 164.

Figure 7:
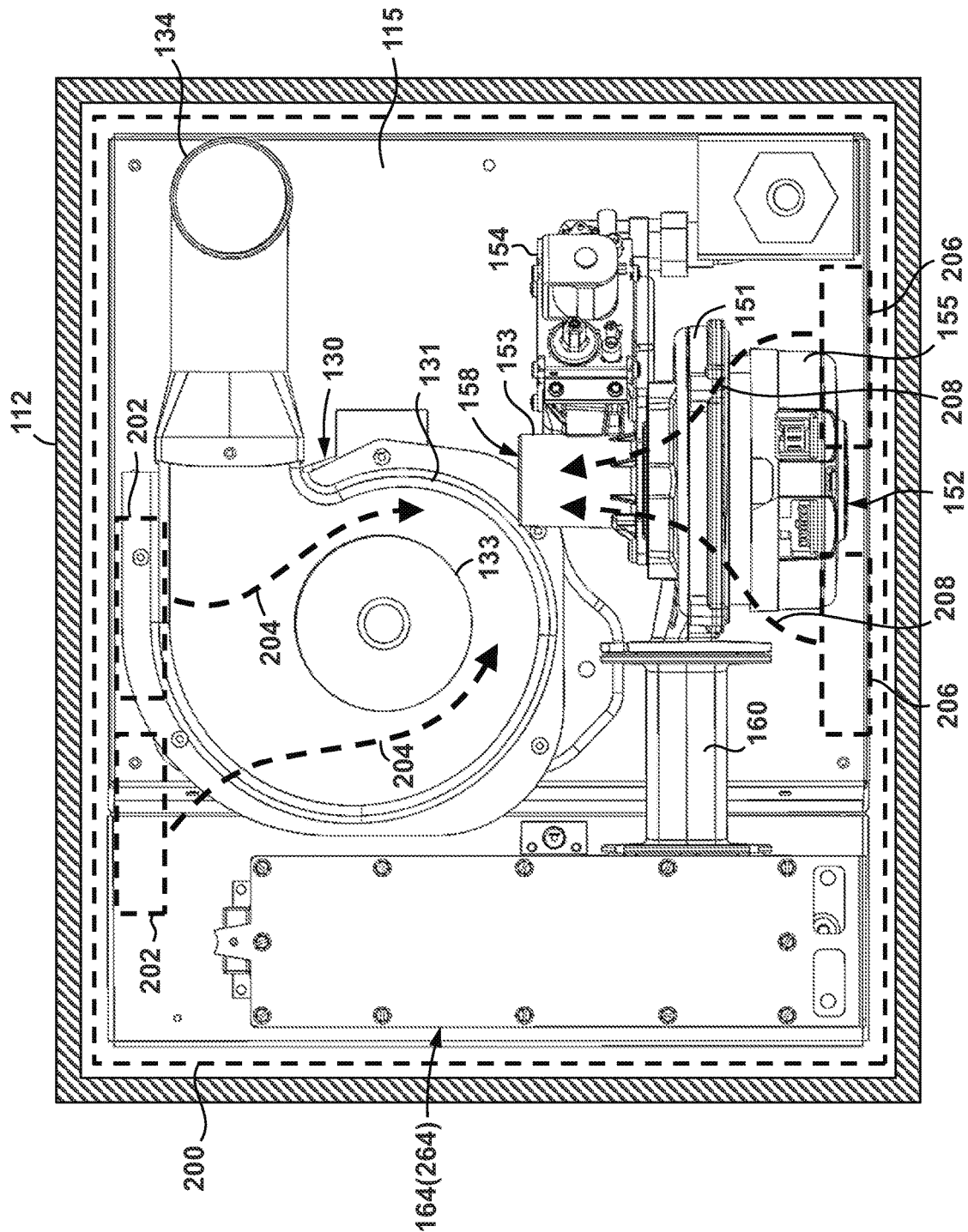
FIG. 7 is a schematic front view of the furnace of FIG. 1 showing the air flows into and through the combustion compartment according to some embodiments.

Referring now to FIG. 7, the placement of inlet nozzle 153, premix blower 152, and combustion blower 130 may be chosen such that primary air that is drawn into the air inlet 158 of inlet nozzle 153 is first flowed over the motors 133, 155 of blowers 130, 152, respectively, so as to provide convective cooling for the blower motors 133, 155, and therefore prevent overheating of the blower motors 133, 155 during operations.

In particular, in some embodiments (e.g., such as the embodiment of FIG. 7) the inlet nozzle 153 and air inlet 158 are generally centrally located within combustion compartment 112, between the motors 155, 133 such that air is drawn over the motors 133, 155 in route to the air inlet 158. As shown in FIG. 7, in this embodiment, the air inlet 158 (and inlet nozzle 153 in general) is disposed vertically between the motors 155, 133 of blowers 152, 130, respectively.

In addition, in some embodiments, air inlets are disposed along the outer surfaces of combustion compartment 112 so as to further channel the incoming air over the motors 133, 155 while the air is in route to air inlet 158 during operations. For instance, as shown in FIG. 7, one or more (e.g., a plurality of) first air inlets 202 may be formed in a front cover (or door) 200 of the combustion compartment 112 that are generally disposed above the motor 133. In other words, the motor 133 is generally disposed between the first inlets 202 and the air inlet 158 of inlet nozzle 153 in the vertical direction (or other linear direction such as horizontal or a diagonal between the vertical and horizontal directions). As a result, during operations, the vacuum created at the air inlet 158 by premix blower 152 generates air flows 204 that flow into the combustion compartment 112, through inlets 202, over and around motor 133, and eventually to air inlet 158. In some embodiments, the inlets 202 are vertically higher than all portions or surface of the motor 133; however, in other embodiments, inlets 202 are disposed vertically higher than a portion of motor 133 (e.g., such as a majority of motor 133 in some embodiments).

Also, front cover 200 of combustion compartment 112 includes one or more second openings 206 that are generally disposed below the motor 155 of premix blower 152. In other words, the motor 155 is generally disposed between the second inlets 206 and air inlet 158 of inlet nozzle 153 in the vertical direction (or other linear direction such as horizontal or a diagonal between the vertical and horizontal directions). As a result, during operations, the vacuum created at the air inlet 158 by premix blower 152 generates air flows 208 that flow into the combustion compartment 112, through inlets 206, over and around motor 155, and eventually to air inlet 158. In some embodiments, the inlets 206 are vertically lower than all portions or surface of the motor 155; however, in other embodiments, inlets 206 are disposed vertically lower than a portion of motor 155 (e.g., such as a majority of motor 155 in some embodiments).

Accordingly, due to the relative placement of the air inlet 158, motors 133, 155, and inlets 202, 206 in front cover 200, the motors 133, 155 may be subjected to convective cooling via the air flows 204, 208 that is configured to maintain an acceptable operating temperature of the motors 133, 155 during operations. In some embodiments, it is desirable to maintain the temperature of the air flowing through premix blower 152 and into burner box 164 as close to ambient as possible.

Also, the flow of air within the combustion compartment 112 (e.g., air flows 204, the flow of secondary air toward and through the gap 174, ports 172, etc.) may provide convective cooling to burner box 164, which thereby maintains a relatively stable temperature within the burner box 164 during operations. Without being limited to this or any other theory, limiting the temperature increases within the burner box 164 during operation of the furnace 100 may allow the fuel/air ratio for producing a reduced amount of NO from the combustion process may be maintained at a relatively constant level. Specifically, the temperature within the burner box 164 and particularly within the housing 168 and about the burner(s) 170, may affect the density of the air within the fuel/air mixture. The density of the air in the fuel/air mixture may then affect rate of combustion and therefore influence the amount of NO that is thereby produced. Normally, one would expect the temperature of the burner box 164 to increase relatively quickly during operations due to the combustion occurring within the burner(s) 170, which would then require adjustments in the fuel/air ratio to maintain relatively low levels of $NO_x$. However, in the furnace 100, the above-described air flow within combustion compartment 112 may help to slow (or even halt) the temperature increase of and within the burner box 164 during operations so that the fuel/air ratio may be held substantially stable during operation, while still producing relatively low levels of $NO_x$ as described above.

Further, reducing the temperature increase within the burner box 164 during operations may also reduce an overall noise of the furnace 100 during operations. Specifically, as the fuel/air mixture, flames, flue products, etc. flow into and through the burner box 164, vibrations are produced that may be audible within a certain distance of the furnace 100. The temperature within the furnace 100 (and particular burner box 164) may alter the resonant frequencies of components of burner box 164 such that adjustments in motor speeds (e.g., blower motors 155, 133), firing rates, etc. may be called for so as to avoid these changing resonant frequencies during operations. However, by reducing the temperature increases within the burner box 164 via the above-described air flows within combustion compartment 112 (e.g., air flows 204, the flow of secondary air toward and through the gap 174, ports 172, etc.), the resonant frequencies of burner box 164 may remain substantially constant or stable so that such adjustments are avoided during operation and the operation of the furnace 100 can be effectively tuned so as to reduce the overall noise.

During operations with the furnace 100, the conditions (e.g., pressure, temperature, fuel/air ratio, etc.) of the combustion process within the burner(s) (e.g., burners 170a, 170b, 170c, etc.) may be precisely controlled via the various structures and features described above so as to produce relatively low levels of $NO_x$ in the flue products. In some embodiments, utilizing the features described above within furnace 100, levels of $NO_x$ below 14 ng/J of $NO_x$ may be produced during operations.

Figure 8:
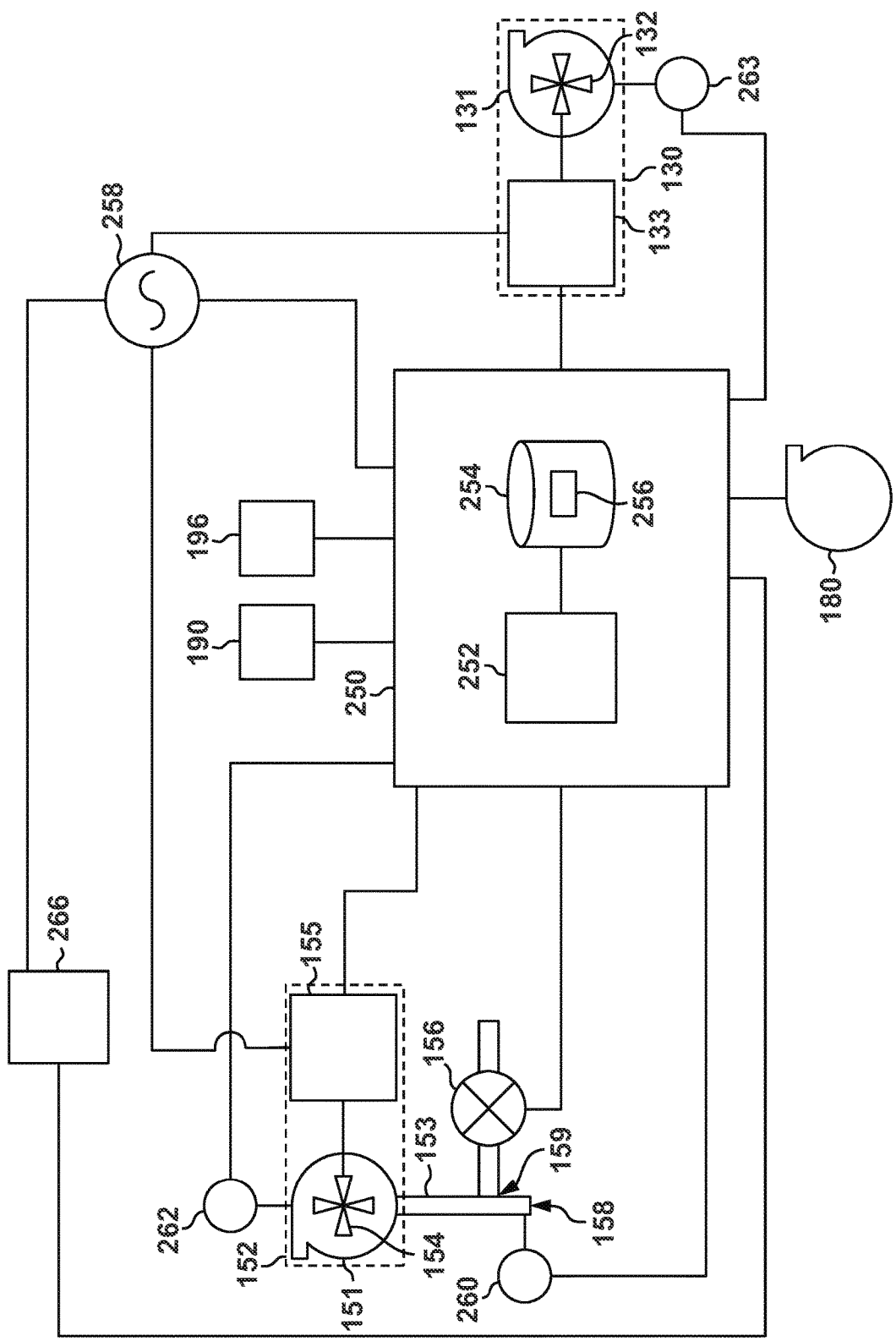
FIG. 8 is a schematic diagram of a controller assembly of the furnace of FIG. 1 according to some embodiments.

Having described various features and components of embodiments of a furnace 100, the discussion will now turn to various control systems and methods that may be utilized with various embodiments of furnace 100. Referring now to FIG. 8, an example controller assembly 250 for furnace 100 is shown. In the discussion below, additional and continuing reference is also made to FIG. 1 which schematically shows the various components of furnace 100 as previously described above.

Generally speaking, the controller assembly 250 is coupled to various components of the furnace 100 as well as various sensors configured to detect various operating parameters within the furnace 100. Controller assembly 250 may comprise a singular controller or control board or may comprise a plurality of controllers or control boards that are coupled to one another. For convenience, and to simplify the drawings, the controller assembly 250 is depicted schematically as a single controller unit that is coupled to the various components and sensors within furnace 100. The controller assembly 250 may be a dedicated control for the furnace 100 or some or all functionality of controller 250 may be integrated with other controllers of an HVAC system, such as a system controller (e.g. a thermostat) or other unit controllers, such as for a packaged unit having both the furnace 100 and air conditioning capability.

As depicted in FIG. 8, controller assembly 250 comprises a processor 252 and a memory 254. The processor 252 (e.g., microprocessor, central processing unit (CPU), or collection of such processor devices, etc.) executes machine-readable instructions 256 provided on memory 254 (e.g., non-transitory machine-readable medium) to provide controller assembly 250 with all the functionality described herein. The memory 254 may comprise volatile storage (e.g., random access memory (RAM)), non-volatile storage (e.g., flash storage, read-only memory (ROM), etc.), or combinations of both volatile and non-volatile storage. Data consumed or produced by the machine-readable instructions 256 can also be stored on memory 254. As noted above, in some embodiments, controller assembly 250 may comprise a collection of controllers and/or control boards that are coupled to one another. As a result, in some embodiments, the controller assembly 250 may comprise a plurality of processors 252, memories 254, etc.

Controller assembly 250 is communicatively coupled to premix blower 152, combustion blower 130, circulation blower 180, fuel valve 156, ignition assembly 190, and flame rod sensor 196, wherein each of these components is configured as previously described above. In addition, controller assembly 250 is communicatively coupled to a plurality of sensors disposed within furnace. For instance, controller assembly 250 is communicatively coupled to a pressure sensor 260 that is configured to detect a pressure within inlet nozzle 153 (or another point upstream of the premix blower 152). The pressure sensor 260 may comprise any suitable device that is configured to detect a pressure or value indicative thereof.

Controller assembly 250 is also communicatively coupled to a first motor sensor 262 and a second motor sensor 263. The first motor sensor 262 is configured to detect a speed of the impeller 154, output shaft (not shown) of motor 155, or both of premix blower 152, and second motor sensor 263 is configured to detect a speed of the impeller 132, output shaft (not shown) of motor 133, or both of combustion blower 130. The motor sensors 262, 263 may comprise any suitable device for measuring a rotational speed of an object (e.g., impeller, shaft, etc.). In some embodiments, the sensors 262, 263 may comprise Hall-effect sensors that utilize magnetic signals for detecting a rotational speed. In some embodiments, the motors sensors 262, 263 may be configured to detect a speed of the impellers 154, 132, motors 155, 133, etc. in a number of revolutions per unit time (e.g., revolutions per minute—RPM).

Referring still to FIG. 8, controller assembly 250 may also be coupled to or integrated with a separate device 266. The separate device 266 may comprise an input/output (I/O) unit (e.g., a graphical user interface, a touchscreen interface, or the like) for displaying information and for receiving user inputs. The device 266 may display information related to the operation of the furnace 100 and may receive user inputs related to operation of the furnace 100. During operations, device 266 may communicate received user inputs to the controller assembly 250, which may then execute control of furnace 100 accordingly. In some embodiments, the device 266 may further be operable to display information and receive user inputs tangentially related and/or unrelated to operation of the furnace 100. In some embodiments, however, the device 266 may not comprise a display and may derive all information from inputs from remote sensors and remote configuration tools (e.g., remote computers, servers, smartphones, tablets, etc.). In some embodiments, controller assembly 250 may receive user inputs from remote configuration tools, and may further communicate information relating to furnace 100 to device 266. In these embodiments, controller assembly 250 may or may not also receive user inputs via device 266. In some embodiments, the controller assembly 250 and/or the device 266 may be embodied in a thermostat that may be disposed within the defined space.

Controller assembly 250 may be communicatively coupled to the various components described above (e.g., blowers 152, 130, 180, valve 156, ignition assembly 190, flame rod sensor 196, sensors 260, 262, 263, device 266, etc.) through any suitable communication path or method. For instance, in some embodiments, controller assembly 250 may be communicatively coupled to these various components via a wired communication path (e.g., electrically conductive wire, fiber optic cable, acoustically conductive cable, electrically conductive pads, traces, contacts, etc.), a wireless communication path (e.g., radio frequency communication, infrared communication, acoustic communication, WIFI, Bluetooth®, near field communication, etc.), or a combination thereof.

In addition, controller assembly 250, device 266, and various components of furnace 100 (e.g., blowers 152, 130, 180, ignition assembly 190, valve 156, sensors 260, 262, 263, etc.) may be coupled to a power source 258. Power source 258 may comprise any suitable source (or collection of sources) of usable power—e.g., such as electrical power). For instance, power source 258 may comprise one or more batteries, capacitors, etc. In some embodiments, the power source 258 may comprise electrical power provided from a local utility. Some of the components within furnace 100 may receive power (e.g., electrical power) directly from power source 258 or indirectly through other components (e.g., such as controller assembly 250). It should be noted that only some of the example connections to power source 258 are shown for the depicted components of furnace 100 and controller assembly 250 so as to simplify figure. In this embodiment, the power source 258 provides a source of Alternating Current (AC) power.

Various control methods for furnace 100 are now described herein. In some embodiments, the following methods may be performed utilizing embodiments of furnace 100 and controller assembly 250 as described herein. Thus, in describing the following methods, continuing reference is made to the components of furnace 100 and controller assembly 250 previously described above and/or generally shown in FIGS. 1-8.

Figure 9:
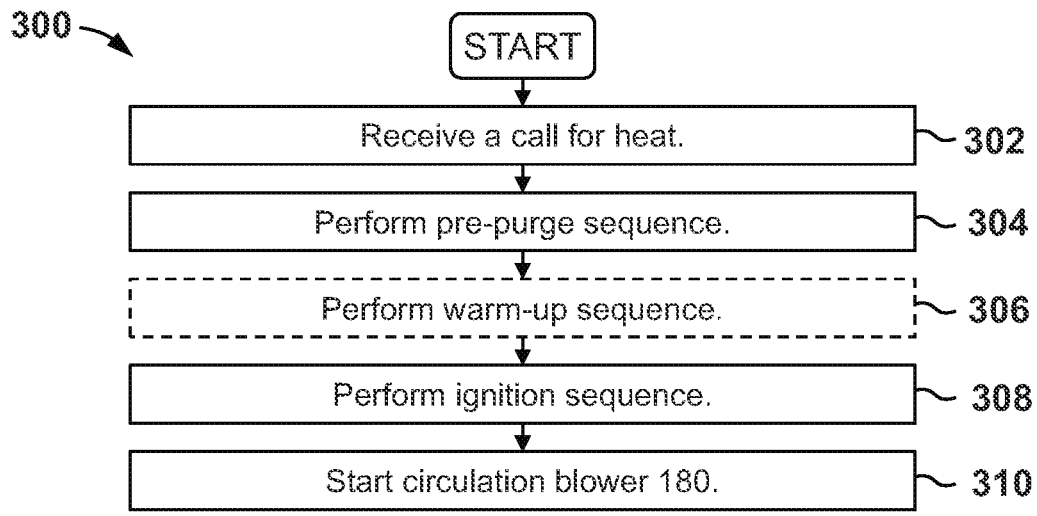
FIG. 9 is a block diagram of a method for starting up the furnace of FIG. 1 according to some embodiments.

Referring now to FIG. 9, a method 300 of starting up furnace 100 is shown. Initially, method 300 includes receiving a call for heat at block 302. The call for heat may be received by the controller assembly 250 from another device (e.g., such as device 266) or may be generated within the controller assembly 250 itself (e.g., such as in embodiments where the controller assembly 250 is or is incorporated within a thermostat or other suitable user input device for furnace 100). The call for heat may be derived upon detecting or determining that the temperature within the defined space serviced by the furnace 100 is below a desired temperature or temperature range.

After the call for heat is received at block 302, method 300 proceeds to perform a pre-purge sequence at block 304. Generally speaking, the pre-purge method may be configured to purge fuel and/or flue products from the furnace 100 prior to initiating subsequent combustion operations. More particular, the pre-purge sequence may sweep or purge flue products out of the heat exchanger assembly 120 (e.g., heat exchanger tubes 122, 124, headers 116, 117, flue pipe 134, etc.), and may sweep or purge fuel from portions of the combustion assembly 150 (e.g., the inlet nozzle 153, premix blower 152, conduit 160, chamber 166, housing 168, burner(s) 170, etc.).

Figure 10:
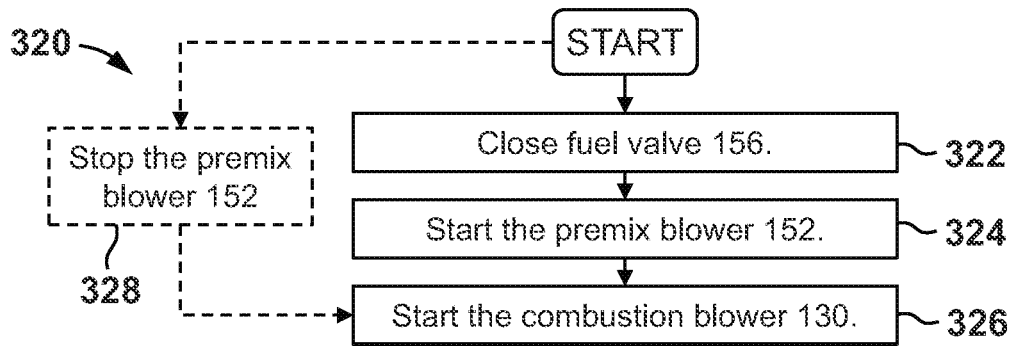
FIG. 10 is a block diagram of a method for performing a pre-purge sequence for the furnace of FIG. 1 according to some embodiments.

Referring now to FIG. 10, an embodiment of a method 320 for performing a pre-purge sequence for furnace 100 is shown. The method 320 may be performed as block 304 within method 300 in FIG. 9.

Initially, method 320 includes closing the fuel valve 156 at block 322. For instance, for the furnace 100 and controller assembly 250, the controller assembly 250 may close the fuel valve 156 so as to prevent any fuel (e.g., natural gas, propane, etc.) from flowing through the fuel valve 156 into the inlet nozzle 153. As previously described above, the fuel valve 156 may comprise a negative pressure regulator valve that opens in response to a negative pressure generated by the operation of the premix blower 152. In addition, in some embodiments, the valve 156 may be closable by controller assembly 250 (e.g., via a suitable actuator that is communicatively coupled to controller assembly 250) so as to prevent fuel from flowing out of the valve 156 into the inlet nozzle 153 regardless of the pressure at the gas inlet 159 and/or operating state of the premix blower 152.

In addition, method 320 includes starting the premix blower 152 at block 324 and starting the combustion blower 130 at block 326. Specifically, blocks 324 and 326 comprise starting the premix blower 152 and the combustion blower 130 via the controller assembly 250 so as to cause the motors 155, 133 to rotate the impellers 154, 132 within the blower housings 151, 131. As a result, air may be drawn into the air inlet 158 of inlet nozzle 153, flowed through the premix blower 152 and into burner box 164. The air is then emitted from burner(s) 170 and flows into the primary heat exchanger tube(s) 122 of heat exchanger assembly 120. Thereafter, the negative pressure generated by the combustion blower 130 may draw the air through the heat exchanger tubes 122, 124, headers 116, 117 and into flue pipe 134 which then vents the air into the outer environment. As the air is flowing through the combustion assembly 150 and heat exchanger assembly 120 as described above, fuel and flue products present therein (e.g., such as might be retained within the combustion assembly 150 and/or heat exchanger assembly 120 at the end of the previous operation of furnace 100), may be swept from the furnace 10 and vented to the outside environment. Without being limited to this or any other theory, purging flue products and fuel from the furnace 100 prior to initiating an operation thereof may prevent an improper fuel/air ratio within the burner(s) 170 when combustion is later ignited within the burner(s) 170. In addition, in some embodiments, the pre-purge method (e.g., method 320) at block 304 may help to ensure that combustion does not occur within burner(s) 170 until desired by removing potentially combustible materials from furnace 100.

Referring still to FIG. 10, in some embodiments, method 320 may comprise stopping the premix blower 152 at block 328 in lieu of closing the gas valve 156 and starting the premix blower 152 at blocks 322 and 324, respectively, as previously described above. As previously described above, the fuel valve 156 may comprise a negative pressure regulator valve that opens in response to a negative pressure generated by the operation of the premix blower 152. As a result, by stopping the premix blower 152 at block 328, fuel may not be drawn through fuel valve 156 and therefore into the burner box 164, so that actuating or closing the gar valve 156 may be unnecessary. In these embodiments (e.g., where the block 328 is performed in lieu of blocks 322, 324), the combustion blower 130 may be started at block 326 following (or at the same time as) stopping the premix blower 152 at block 328.

Referring again to FIG. 9, in some embodiments, method 300 may also comprise performing a warm-up sequence at block 306. In particular, in some embodiments of furnace 100 the ignition assembly 190 comprises a hot surface style igniter as previously described above. As a result, the hot surface may be pre-warmed prior to introducing fuel/air mixture into the burner(s) 170 so as ensure more reliable ignition within burner(s) 170.

Figure 11:
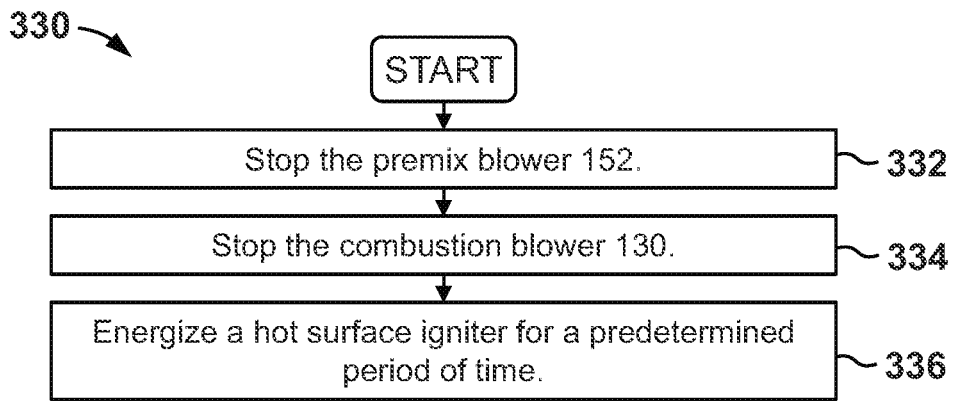
FIG. 11 is a block diagram of a method for performing a warm-up sequence of the for the furnace of FIG. 1 according to some embodiments.

Referring now to FIG. 11, a method 330 for performing a warm-up sequence within furnace 100 is shown. In some embodiments, the method 330 may be performed as block 306 within method 300 in FIG. 9.

Initially, method 330 includes stopping the premix blower 152 at block 332, and stopping the combustion blower 130 at block 334. In particular, blocks 332, 334 may comprise stopping the premix blower 152 and combustion blower 130 so as to prevent motors 155 and 133, respectively from rotating impellers 154 and 132, respectively, via controller assembly 250.

In addition, method 330 includes energizing the hot surface igniter for a predetermined period of time at block 336. As previously described, when ignition assembly 190 is a hot surface style igniter electric current may be supplied through a resistive surface so as to generate heat. Thus, when the hot surface is energized as in block 336, the temperature of the hot surface begins to increase. The predetermined period of time at block 336 may be a sufficient amount of time based on the electrical current flowing through the hot surface as well as the design (e.g., material, shape, size, etc.) of the hot surface, such that the hot surface igniter reaches an appropriate temperature to ignite the fuel/air mixture when the mixture is flowed over the hot surface subsequent to the warm-up method 320. In some embodiments, the temperature hot surface igniter may be raised above the flash point temperature of the fuel/air mixture (or the flash point of the fuel disposed within the fuel/air mixture) that is to be provided to burner(s) 170 and hot surface igniter.

It should be appreciated that in some embodiments of method 300, the warm-up sequence of block 306 may be omitted. For instance, in some embodiments, ignition assembly 190 may comprise a direct spark igniter such that warm-up sequence is not necessary prior to an ignition sequence (see e.g., block 308 described in more detail below).

Referring again to FIG. 9, method 300 also includes performing an ignition sequence at block 308. As generally described above, an ignition sequence within furnace 100 may be different depending on the design and type of ignition assembly 190.

Figure 12:
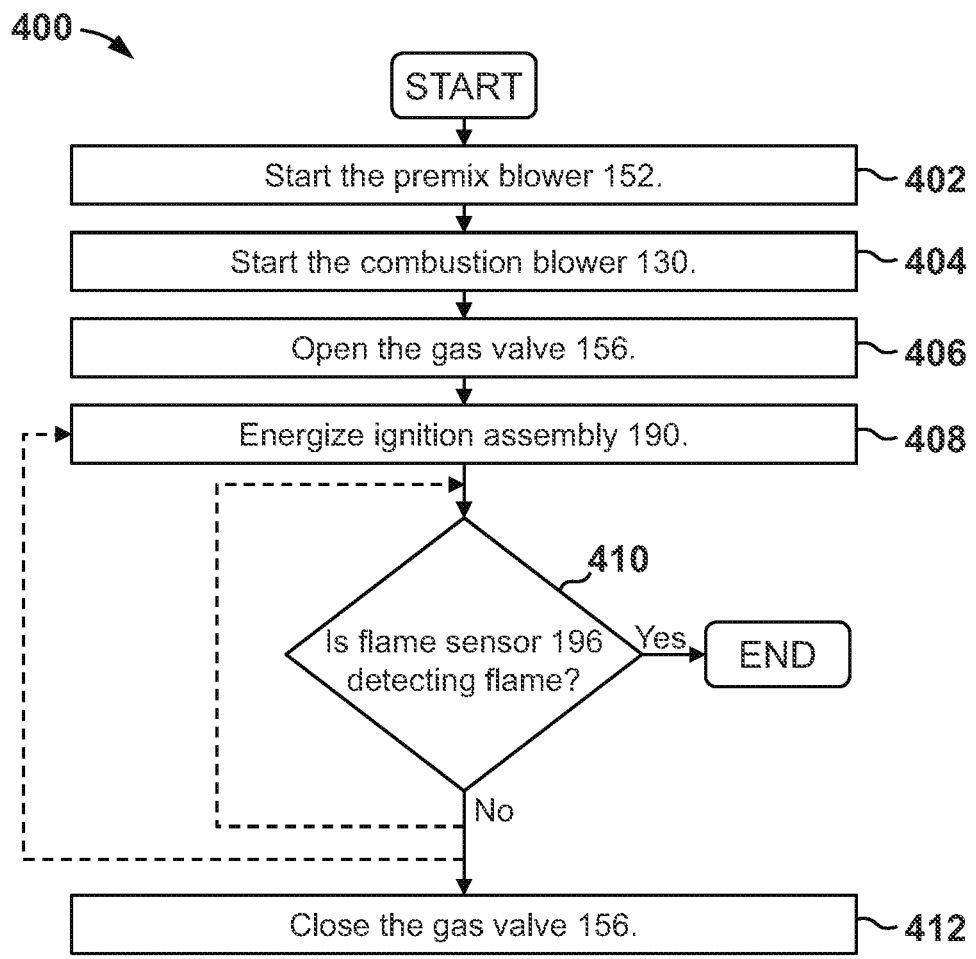
FIG. 12 is a block diagram of a method for performing an ignition sequence for the furnace of FIG. 1 according to some embodiments.

Referring now to FIG. 12, a method 400 of igniting furnace 100 is shown. In some embodiments, method 400 may be performed as block 308 within method 300 in FIG. 9. Initially, method 400 includes starting the premix blower 152 at block 402 and starting the combustion blower 130 at block 404. As previously described, operation of the premix blower 152 and combustion blower 130 may initiate the flow of fluid (e.g., initially air) through the combustion assembly 150 and heat exchanger assembly 120. In addition, method 400 includes opening the fuel valve 156 at block 408. Specifically, in some embodiments, after the energization of blowers 152, 130, the fuel valve 156 may be opened so as to start the flow of fuel to the burner box 164 along with the air flowing into the inlet nozzle 153 at air inlet 158. In some embodiments, the premix blower 152 may be started in response to or simultaneously with opening the fuel valve 156 at block 408.

Method 400 also includes energizing the ignition assembly 190 at block 408. The precise method and timing of energizing the ignition assembly 190 will often depend on the type and design of ignition assembly 190 that is being utilized within furnace 100. As previously described above, in some embodiments, the ignition assembly 190 comprises a direct-spark igniter. As a result, in these embodiments, energization of the ignition assembly 190 at block 408 may occur by conducting electric current to one of the electrodes 192, 194 so as to generate an electrical arc between the tips 192a, 194a of electrodes 192, 194. In some embodiments, electric current is not conducted to the one of the electrodes 192, 194 until a sufficient time has passed since opening the fuel valve 156 and initiating the flow of fuel to the burner(s) 170 at block 406, so that a sufficient volume of fuel (within a fuel/air mixture) is present within the burner(s) 170 to ensure reliable ignition when a spark is emitted between the electrodes 192, 194.

In other embodiments, the ignition assembly 190 may comprise a hot surface type igniter as previously described. In these embodiments, energizing the ignition assembly 190 may comprise energizing the hot surface with electric current so as to increase a temperature thereof as previously described. However, in these embodiments, the energization of the hot surface igniter may occur before or simultaneously with opening the fuel valve 156 and initiating the flow of fuel to the burner(s) 170. For instance, in these embodiments, the energization of the ignition assembly 190 may occur during a previous warm-up method (e.g., at block 306 of method 300). Specifically, as previously described, during the warm-up sequence, the hot surface style ignition assembly may be energized with electric current so as to increase a temperature thereof (see e.g., block 336 in method 330 of FIG. 11). The ignition assembly 190 may then remain energized so as to maintain the heat of the hot surface so that ignition may occur once the fuel (and mixed air) reaches the hot surface following opening of the fuel valve at block 406. Thus, in some embodiments of method 400, energizing the ignition assembly 190 at block 408 may occur before blocks 402-406.

Referring still to FIG. 12, following starting of the premix blower 152 and combustion blower 130 at blocks 402 and 404, respectively, opening of the fuel valve 156 at block 406, and energization of the ignition assembly 190 at block 408, method 400 next includes determining whether flame sensor 196 is detecting flame at block 410. As previously described, flame rod sensor 196 may detect the presence of flame within one or more of the burners 170 (e.g., burners 170a, 170b, 170c, etc.) by detecting an electric current that is conducted through the flame.

If flame is detected at block 410, method 400 ends; however, if flame is not detected at block 410, method 400 proceeds to close the fuel valve 156 at block 412. Specifically, as previously described, if the flame rod sensor 196 detects electric current conducted through the flames within the burner(s) 170 (e.g., burners 170a, 170b, 170c, etc. in FIGS. 5 and 6), then it may be determined that flames are present in the burner(s) 170 following energization of the ignition assembly 190 and opening the fuel valve 156. Thus, in this event, the ignition method 400 may end and normal operations of the furnace 100 will proceed thereafter. Alternatively, upon determining that no flame is present at block 410, method 400 may recycle to either re-energize the ignition assembly 190 at block 408 or to again determine whether flame is present at block 410.

Specifically, if the flame rod sensor 196 does not detect the present of flame within the burner(s) 170, then it will be assumed that the fuel/air mixture flowing into the burner(s) 170 did not ignite as a result of energizing the ignition assembly 190 at block 408. As a result, method 400 may proceed, in some embodiments, to close the fuel valve at block 412 and thereby prevent the build-up of un-combusted fuel/air mixture in the burner box 164, heat exchanger assembly 120, and possibly in the environment surrounding the furnace 100 (which may present a dangerous risk of an uncontrolled explosion in and around the furnace 100). However, in some embodiments, method 400 may reattempt to ignite the fuel/air mixture with the ignition assembly 190 at block 408 and/or to re-determine whether flames are present within the burner(s) 170 via the flame rod sensor 196 at block 410 if no flames are detected at block 410.

Referring again to FIG. 9, following the performance of the ignition sequence at block 308 (e.g., method 400 in FIG. 12), method 300 proceeds to start the circulation blower 180 at block 310. Specifically, once combustion has been initiated, the circulation blower 180 may be started so as to initiate the transfer of heat from the hot flue products resulting from the combustion to the airflow 182 provided to the defined space within the heat exchanger assembly 120 as previously described above. For the furnace 100, starting the circulation blower 180 to initiate airflow 182 may occur before, during, or after the ignition sequence at block 308.

For instance, in some embodiments, it may be desirable to delay the initiation of airflow 182 until the heat exchanger tubes 122, 124 of heat exchanger assembly 120 have reached a sufficient temperature so as to ensure a sufficiently high temperature of airflow 182 at the exit of heat exchanger compartment 114 and therefore avoid flowing uncomfortably cool air to the defined space (which may negatively impact occupant comfort). Thus, in these embodiments, controller assembly 250 may wait a predetermined period of time after the ignition sequence at block 308 to start the circulation blower 180 at block 310. In other embodiments, the circulation blower 180 may be started simultaneously, before, or very soon after the ignition sequence at block 308 so as to improve heat transfer efficiency of the furnace 100.

Following the start-up of the furnace 100 (e.g., via method 300), normal operations of the furnace 100 may proceed until the call for heat has ceased for the defined space (e.g., such as when the temperature within the defined space reaches a target value). During these operations, controller assembly 250 may monitor the furnace 100 for a blockage in the air inlet 158 of the premix blower 152. If the air inlet 158 to the premix blower 152 were to become blocked during operations, combustion may be extinguished within the burner(s) 170 and un-combusted fuel may begin to build within and around the furnace 100.

Figure 13:
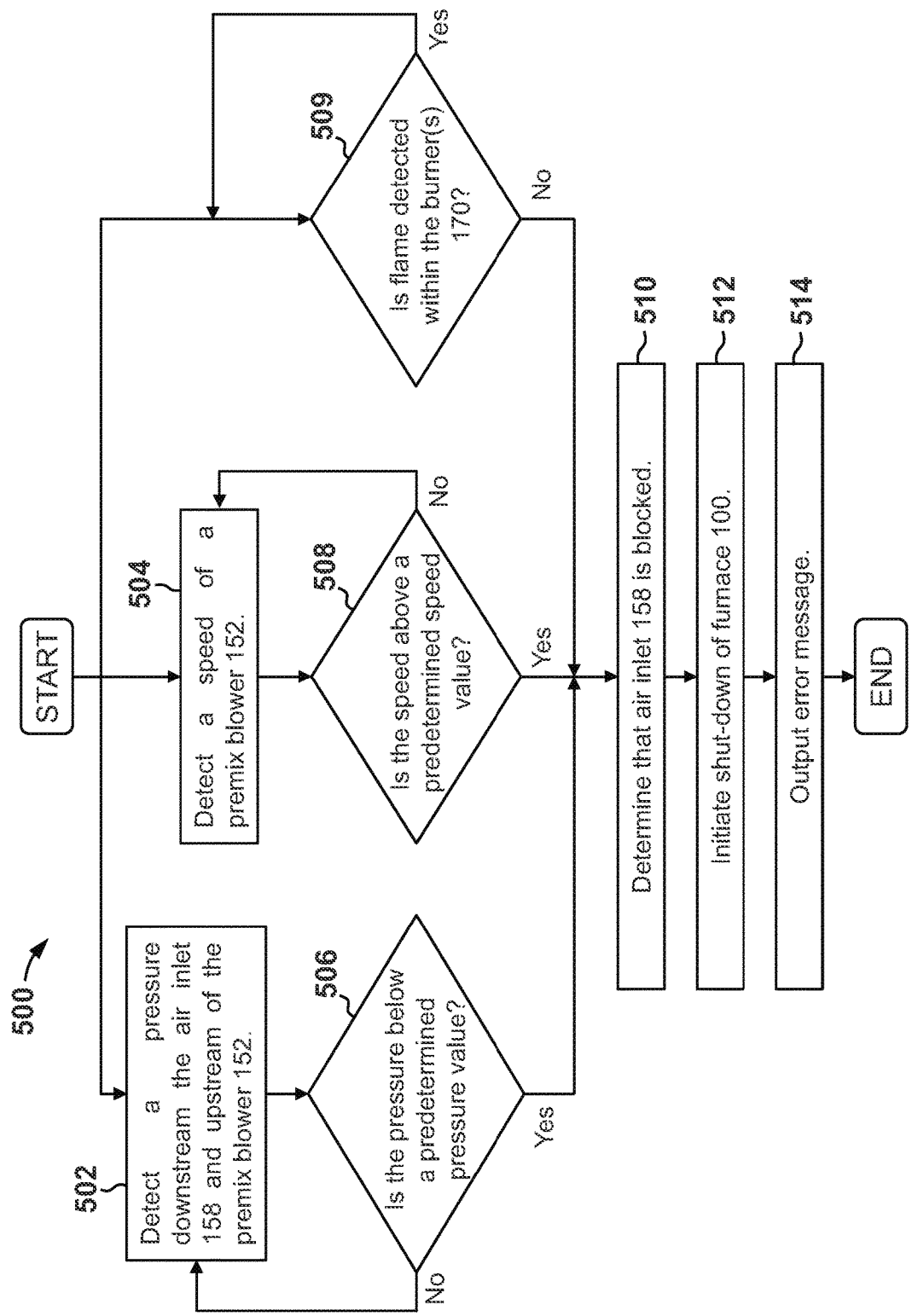
FIG. 13 is a block diagram of a method for detecting a blocked air inlet in a premix blower of the furnace of FIG. 1 according to some embodiments.

Specifically, referring now to FIG. 13, a method 500 of detecting a blocked air inlet 158 of the premix blower 152 is shown. As will be described in more detail below, method 500 includes multiple parallel manners of detecting the blockage within air inlet 158 that may help to increase the sensitivity and reliability of controller assembly 250 in terms of detecting a blocked air inlet 158 of premix blower 152 during operations. As will be described in more detail below, method 500 may employ one, a combination of, or all of these parallel manners and techniques for detecting a blocked air inlet 158 of premix blower 152 during operations.

Specifically, method 500 initially includes detecting a pressure downstream of the air inlet and upstream the premix blower 152 of the furnace at block 502. In particular, block 502 may comprise receiving an output signal from pressure sensor 260 as generally described above.

Following detecting the pressure at block 502, method 500 includes determining whether the pressure is below a predetermined pressure value at block 506. Without being limited to this or any other theory, if the air inlet 158 is blocked during operation of the premix blower 152, the area between the blocked inlet 158 and the premix blower 152 within the inlet nozzle 153 may begin to fall in pressure due to the continued rotation of impeller 154 within housing 151. The predetermined pressure value in block 506 may correspond to a sufficient reduction in pressure within the inlet nozzle 153 so as to indicate that the air inlet 158 has become blocked (e.g., by dust, dirt, or other obstruction).

If it is determined that the pressure detected at block 502 is not below a predetermined pressure value at block 506 (i.e., the determination at block 506 is "no"), then method 500 recycles back to block 502 to once again detect the pressure downstream of the air inlet as previously described. If, on the other hand, it is determined that the pressure detected at block 502 is below the predetermined pressure value at block 506 (i.e., the determination at block 506 is "yes"), then method 500 may proceed to block 510 to determine that the inlet of the premix blower is blocked.

In addition, method 500 comprises detecting a speed of the premix blower 152 at block 504, which may comprise detecting a speed of the impeller 154 or motor 155 of premix blower 152 via the sensor 262 as previously described. Thereafter, method 500 includes determining whether the speed detected at block 504 is above a predetermined speed value at block 508. Without being limited to this or any other theory, when the air inlet 158, becomes blocked, the impeller 154 is impacting a reduced volume of fluid (e.g., air, fuel, etc.) within the blower housing 151 so that a drag force operating on impeller 154 is reduced. As a result, for a given torque supplied from motor 155, the impeller 154 will rotate at an increased speed, as the air inlet 158 becomes blocked. The predetermined speed value at block 508 may correspond with an expected increase in speed impeller 154 that may result from a blockage in the air inlet 158 of inlet nozzle 153.

If it is determined that the speed detected at block 504 is not above a predetermined speed value at block 508 (i.e., the determination at block 508 is "no"), then method 500 recycles back to block 504 to once again detect the speed of the premix blower 152 as previously described. If, on the other hand, it is determined that the speed detected at block 504 is above the predetermined speed value at block 508 (i.e., the determination at block 508 is "yes"), then method 500 may again proceed to block 510 to determine that the inlet of the premix blower 152 is blocked.

Further, method 500 also includes determining whether a flame is present with in the burner(s) 170 of furnace 100 at block 509. In particular and without being limited to this or any other theory, if the air inlet 158 of the inlet nozzle 153 becomes blocked, the combustion process may stop within the burner(s) 170 due to a lack of oxygen. Thus, at block 509, the flame rod sensor 196 may be utilized in the manner described above so as to monitor for the presence of flame within the burner(s) 170. If the flame rod sensor 196 should detect flames within the burner(s) 170 (i.e., the determination at block 509 is "yes"), then method 500 recycles back to once again determine whether flame is presented within the burner(s) 170 at block 509. If, on the other hand, flame rod sensor 196 does not detect a flame within the burner(s) 170 (i.e., the determination at block 509 is "no"), then method 500 may again proceed to block 510 to determine that the inlet of premix blower 152 is blocked. As previously described above, the flame rod sensor 196 may be placed within one of the burner housings 176 and therefore close to the location where combustion is initiated for the fuel/air mixture within burner box 164. As a result, the flame rod sensor 196 may detect the loss of flame that may result from a blockage in the air inlet 158 relatively early (e.g., as compared to situations where flame rod sensor 196 is disposed outside of burner housing 176).

Thus, method 500 allows a block air inlet 158 of premix blower 152 to be detected via a pressure measurement upstream of the premix blower 152 (e.g., via blocks 502 and 506), a speed measurement of the impeller 154 or motor 155 of premix blower 152 (e.g., via blocks 504 and 508), and/or detecting a loss of flames within the burner(s) 170 (e.g., via block 509). Accordingly, a blocked air inlet 158 may be more reliably detected (e.g., by controller assembly 250) during operations via method 500. In some embodiments, method 500 may detect the blocked inlet 158 at block 510 via only one of the pressure measurements via blocks 502 and 506, the speed measurements via blocks 504 and 508, and/or the flame loss detection at block 509. Alternatively, in some embodiments, method 500 may detect the blocked inlet 158 at block 510 via a combination or all of the pressure measurements via blocks 502 and 506, the speed measurements via blocks 504 and 508, and the flame loss detection at block 509.

Regardless of whether the determination at block 510 is reached as a result of the determination at block 506, the determination at block 508, and/or the determination at block 509, once it is determined that the inlet of the premix blower is blocked at block 510, method 500 proceeds to initiate a shut-down of the furnace 10. For instance, the controller assembly 250 may directly shut down the furnace 10 by, for example, closing the fuel valve 156, and stopping the premix blower 152, combustion blower 130, and/or circulation blower 180. In some embodiments, the controller assembly 250 may initiate a shutdown of the furnace 10 by sending a shutdown command to another device (e.g., device 266) that then directly initiates a shutdown of one of more components of the furnace 10. In addition, in some embodiments method 500 also includes outputting an error message at block 514, which may include an audible alarm, a message displayed on a display or other suitable location, so as to alert a user of the furnace (e.g., an occupant of the defined space) that an error has occurred within the furnace 10 (e.g., the air inlet 158 is blocked) and a service technician should be contacted to address the error. The error message at block 514 may be output by controller assembly 250 (or another device such as device 266).

In addition to detecting a blocked inlet for the premix blower 152, during operations with furnace 100, controller assembly 250 may also modulate a speed of the blowers 152, 130, and/or 180 so as to counteract voltage fluctuations provided by power source 258. For instance, in some embodiments, power source 258 may comprise a source of electrical power (e.g., AC electric current) from a local utility as previously described. In some circumstances, the electrical power provided by power supply 258 may include voltage fluctuations that may cause the speeds of blowers 152, 130, 180 to also fluctuate. Accordingly, reference is now made to FIG. 14, which shows a method 600 of maintaining a speed for a blower (or multiple blowers) of furnace 100 in light of a fluctuating input voltage. Method 600 may generally be applied by the controller assembly 250 to the control the speed of any of the premix blower 152, combustion blower 130, and circulation blower 180 during operations.

Initially, method 600 comprises detecting a speed of a blower of furnace 100 at block 602. For furnace 100, block 602 may comprise detecting the speed of the premix blower 152, the combustion blower 130, and/or the circulation blower 180. The speed of the blowers 152, 130, 180 may be detected in any suitable manner. For instance, in some embodiments, the speed of the blowers 152, 130 may be detected by the sensors 262, 263 as previously described above. Similarly, another sensor (not shown) similar to the sensors 262, 263 may be coupled to the circulation blower 180 and communicatively coupled to the controller assembly 250 so as to allow controller assembly 250 to detect the speed of the circulation blower 180 in the same manner as previously described above for the sensors 262, 263 for blowers 152, 130, respectively.

Next, method 600 proceeds to determine whether the speed of the blower is below a predetermined lower limit at block 604. If the blower speed is below the predetermined lower limit (i.e., the determination at block 604 is "yes"), then method 600 proceeds to shut down the furnace 100 at block 612 and output an error message at block 614. On the other hand, if it is determined at block 604 that the speed is not below the predetermined lower limit (i.e., the determination at block 604 is "no"), method 600 proceeds to determine whether the speed of the blower is above a predetermined upper limit at block 606. If the blower speed is above the predetermined upper limit at block 606, method 600 proceeds again to blocks 612 and 614 to shut down the furnace and output and error message as previously described. If, on the other hand, the blower speed is not above the predetermined upper limit at block 606 (i.e., the determination at block 606 is "no"), method 600 proceeds to determine an error between a target speed of the blower and the detected speed at block 608 and then adjust the speed of the blower to reduce the error below a target error value at block 610.

In some embodiments, the predetermined lower limit in block 604 and the predetermined upper limit in block 606 may correspond with the lowest and highest speeds, respectively, of the blower (e.g., blower 152, 130, 180, etc.) that correspond with expected fluctuations in the voltage supplied from power source 258. In some embodiments, the predetermined lower limit in block 604 and the predetermined upper limit in block 606 may correspond with the lowest and highest speeds, respectively, of the blower (e.g., blower 152, 130, 180) that correspond with the lowest and highest acceptable voltage values that may be utilized by the blower for operation. Thus, if the speed of the blower is below the predetermined lower limit in block 604 or above the predetermined upper limit at block 606, then it may be determined that the blower (e.g., blowers 152, 130, 180, etc.) is operating outside of its predetermined normal or acceptable range (e.g., such as outside of the blowers rated input voltage range) so that operations with the blower (and the furnace 100 more generally) must cease and an error flag is triggered (e.g., by the controller assembly 250) so as to alert a user of the furnace that a service technician needs to be contacted to determine and address the error within the furnace 100 before operations may once again commence.

If, on the other hand, the detected speed of the blower between the predetermined lower limit in block 604 and the predetermined upper limit in block 606, then it may be determined that the blower (e.g., blower 152, 130, 180, etc.) is operating within a normal input voltage range. Accordingly, as previously described above, method 600 may determine an error between the detected speed and the target speed of the blower and then adjust the speed of the blower so as to reduce or eliminate this error at blocks 608, 610. Specifically, at block 608, determining the error between the target speed and the detected speed from block 602 may comprise determining a difference between a target value (which may be a target speed value for the blower based on the current operational state of the furnace 100) and the detected speed from block 602. Once the error is determined, it is compared to a target error that may correspond with an acceptable tolerance about the target speed value at block 610. The size of the speed tolerance about the target speed value may vary depending on, for instance, the design of furnace 100, the capacity demand for the furnace 100, or the particular use of the blower (e.g., whether it is the premix blower 152, combustion blower 130, circulation blower 180, etc.).

Next, method 600 proceeds to adjust the speed of the blower so as to decrease the error determined at block 608. In some embodiments, the controller assembly 250 utilizes a proportional and integral (PI) control scheme to reduce the error between the target speed value and the detected speed value at block 602 below the target error. Specifically, if the detected speed of the blower from blower 602 is above the target speed value, due to an increase in the voltage supplied to the blower via the power source 258, then block 610 may comprise reducing the speed of the blower via the controller assembly 250 so as to reduce the error below the target error and cause the speed of the blower to move closer to the target speed value. If, on the other hand, the detected speed of the blower from block 602 is below the target speed value, due to a decrease in the voltage supplied to the blower via the power source 258, then block 610 may comprise increase the speed of the blower via the controller assembly 250 so as to reduce the error below the target error and cause the speed to move closer to the target speed value.

Figure 14:
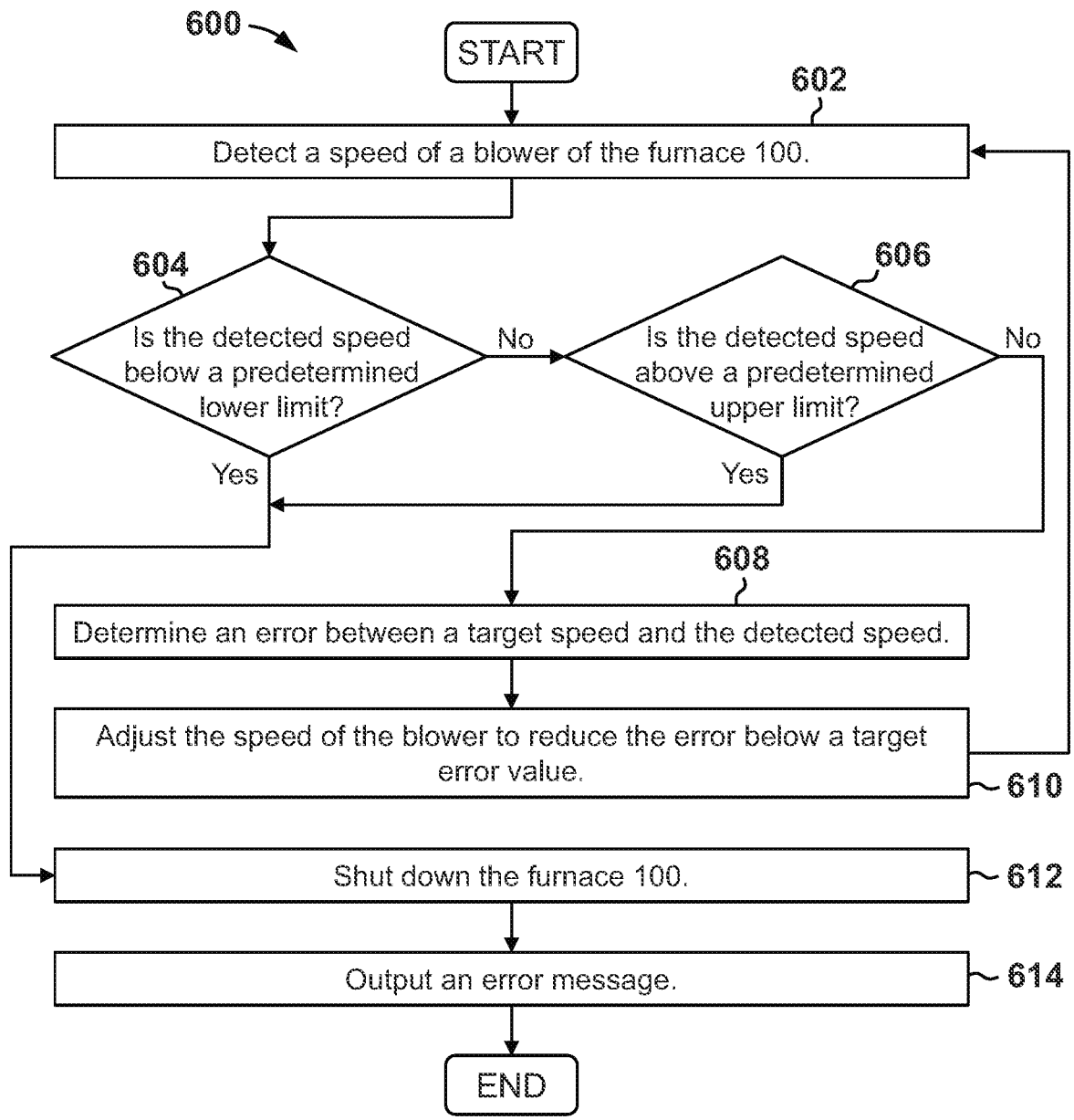
FIG. 14 is a block diagram of a method for adjusting a speed of a blower of the furnace of FIG. 1 to account for input voltage fluctuations according to some embodiments.

Referring now to FIGS. 13 and 14, in some embodiments, furnace 100 and controller assembly 250 may simultaneously perform the methods 500 and 600 during operation of the furnace so as to simultaneously monitor for a blocked air inlet 158 and adjust the speed of blowers 152, 130, 180 to account for voltage fluctuations. Thus, for the premix blower 152, controller assembly 250 may be simultaneously monitoring the speed of the impeller 154 (or motor 155) for via blocks 504, 508 to assess whether air inlet 158 is blocked, and adjusting the speed of the impeller 154 and motor 155 of premix blower 152 to account for voltage fluctuation from power source 258. In order to allow these two operations within methods 500, 600 to operate simultaneously on premix blower 152 without interference, the predetermined speed value from block 508 of method 500 in FIG. 13 may be equal to or higher than the predetermined upper limit of the speed of the premix blower 152 at block 606 of method 600. As a result, a blocked air inlet 158 is not detected via method 500 as a result of speed changes within the premix blower 152 resulting from voltage fluctuations in power source 258. Also, if the speed of the premix blower 152 should rise above the predetermined upper limit from block 606 of method 600, the furnace 100 may be shut down via block 612 and an error message may be output via block 614. In these circumstances, the generated error message may indicate that both an improper input voltage as well as a blocked air inlet 158 may be present within the furnace 100 so as to alert the service technician to inspect the furnace 100 for both problems.

Referring again to FIG. 8, during operations with furnace 100, a speed control of the premix blower 152 may be adjusted based on an altitude of the furnace 100 (e.g., above sea-level). For instance, if furnace 100 is operated in a location that is relatively high above sea-level (e.g., such as in a mountainous region), the air supply from the surrounding environment may be generally less dense, so that a resistance imposed on the impeller 154 of premix blower 152 may be decreased. As a result, for a given power input to the premix blower 152, the impeller 154 may rotate at a faster rate than what would be expected when furnace 100 is operated in lower altitudes (e.g., such as at or near sea-level).

Accordingly, during operations, controller assembly 250 may decrease an input or controlled speed of the premix blower 152 (e.g., a speed of impeller 154) so as to counteract the expected increase in impeller 154 speed associated with increased altitudes, and therefore maintain the fuel/air ratio within the desired range for reducing $NO_x$ production and providing adequate heating performance and capacity as described herein. In other words, controller assembly 250 may decrease the controlled speed of the premix blower 152 (e.g., by decreasing the electric power level supplied to the premix blower 152) as the altitude of the furnace 100 increases.

As described above, the embodiments disclosed herein include furnaces and associated methods of operation that allow a furnace to produce relatively low levels of NO in the flue products, while still delivering reliable and satisfactory heating capacity for the associated defined space. At least some of the furnaces disclosed above may comprise a "push-pull" furnace that employs a first blower to "push" pressurized air and fuel to a burner box (where the air and fuel is combusted), and a second blower to "pull" the flue products resulting from the combustion through one or more heat exchanger tubes. In some embodiments, the furnaces of the embodiments disclosed herein may combust fuel at suitable fuel/air ratio so as to produce less than 14 ng/J of $NO_x$, but while still achieving reliable and stable combustion for delivering adequate heating capacity to the defined space during operation.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A furnace, comprising:
a burner box including two or more burners configured to combust a fuel/air mixture, each burner aligned with a port in a premixing chamber and including a burner housing and a burner medium, wherein each burner medium is disposed between the premixing chamber and the respective burner housing, and each burner housing is a hollow cylindrical member;
a pair of electrodes extended inward toward the burner medium along the burner housing for a first burner of the two or more burners, and each electrode including an uninsulated portion disposed nearest the at least one burner;
a flame sensor configured to detect an upset in the combustion of the fuel/air mixture, the flame sensor disposed through a side of the burner housing for a second burner of the two or more burners, the second burner being different from the first burner;
a first blower including an inlet nozzle having an air inlet and fuel inlet, wherein the inlet nozzle is configured such that operation of the first blower is to pull air and fuel into the inlet nozzle via the air inlet and fuel inlet, respectively, to produce the fuel/air mixture at a fuel/air ratio that is configured to produce flue products having less than 14 Nano-grams per Joule (ng/J) of nitrogen oxides (NOx) when combusted in the at least one burner,
wherein operation of the first blower is configured to push the fuel/air mixture into the burner box,
wherein combustion of the fuel/air mixture within the at least one burner is initiated by the pair of electrodes;
a heat exchanger assembly fluidly coupled to the burner box through a vestibule;
a second blower configured to pull the flue products through the heat exchanger assembly; and
a controller assembly coupled to at least the flame sensor and configured to adjust operation of the furnace in response to the detected upset.

2. The furnace of claim 1, comprising a fuel valve coupled between the fuel inlet and a fuel source, wherein the fuel valve is configured to open in response to a sub-atmospheric pressure at the fuel inlet.

3. The furnace of claim 2, wherein the air inlet is arranged within a compartment of the furnace along with the first blower and the second blower such that air flows that are pulled toward the air inlet are directed over a motor of the first blower and a motor of the second blower.

4. The furnace of claim 3, wherein an outer surface of the compartment comprises a first opening and a second opening, wherein the motor of the first blower is disposed between the first opening and the air inlet along a first flow path of air into the air inlet, and wherein the motor of the second blower is disposed between the second opening and the air inlet along a second flow path of air into the air inlet.

5. The furnace of claim 1, comprising:
a first sensor to detect a pressure of the inlet nozzle;
a second sensor to detect a speed of the first blower; and
the controller assembly coupled to the first sensor and the second sensor, wherein the controller assembly is further configured to detect a blockage in the air inlet based on an output of the first sensor or the second sensor.

6. The furnace of claim 5, wherein the controller assembly is further configured to detect a voltage fluctuation from a power source of the first blower based on an output from the second sensor.

7. The furnace of claim 1, wherein the flame sensor configured to detect an upset in the combustion of the fuel/air mixture is further configured to detect the upset before an occurrence of flame loss, wherein the detected upset is a flame lift-off condition within the at least the burner housing, and
wherein the controller assembly configured to adjust operation of the furnace includes varying the speed of the first blower to remedy the detected upset.

8. A method of operating a furnace, the method comprising:
(a) pulling air into an air inlet of an inlet nozzle and fuel into a fuel inlet of the inlet nozzle with a first blower to form a fuel/air mixture at a fuel/air ratio;
(b) pushing the fuel/air mixture into a burner box with the first blower, the burner box including two or more burners, each burner aligned with a port in a premixing chamber and including a burner housing and a burner medium, wherein each burner medium is disposed between the premixing chamber and the respective burner housing, and each burner housing is a hollow cylindrical member;
(c1) initiating combustion of the fuel/air mixture using a pair of electrodes, the pair of electrodes extended inward toward the burner medium along the burner housing for a first burner of the two or more burners, and each electrode including an uninsulated portion disposed nearest the at least one burner;
(c2) combusting the fuel/air mixture within a burner of the burner box to produce flue products having less than 14 Nano-grams per Joule (ng/J) of nitrogen oxides (NOx);
(c3) detecting an upset in combustion using a flame sensor, the flame sensor disposed through a side of the burner housing for a second burner of the two or more burners, the second burner being different from the first burner;
(c4) adjusting operation of the furnace in response to the detected upset; and
(d) pulling the flue products through a heat exchanger assembly with a second blower.

9. The method of claim 8, wherein (a) comprises:
(a1) flowing air across the fuel inlet;
(a2) forming a sub-atmospheric pressure at the fuel inlet as a result of (a1); and
(a3) opening a fuel valve coupled to the fuel inlet as a result of the sub-atmospheric pressure; and
(a4) pulling fuel into the fuel inlet in a volume that is proportional to a volume of air flowing into the air inlet.

10. The method of claim 9, comprising pulling the air over a motor of the first blower before pulling the air into the air inlet at (a).

11. The method of claim 10, comprises pulling the air over a motor of the second blower before pulling the air into the air inlet at (a).

12. The method of claim 8, comprising:
(e) detecting a speed of the first blower or a pressure of the inlet nozzle; and
(f) detecting a blockage in the air inlet based on the speed or the pressure detected in (e).

13. The method of claim 12, comprising:
(g) detecting a lack of flame within the burner; and
(h) detecting a blocked inlet of the first blower based on (g).

14. The method of claim 8, comprising:
(i) detecting a speed of the first blower; and
(j) detecting an input voltage fluctuation to the first blower based on the speed detected in (i).

15. The method of claim 8, wherein the flame sensor configured to detect an upset in the combustion of the fuel/air mixture is further configured to detect the upset before an occurrence of flame loss, wherein the detected upset is a flame lift-off condition within at least the burner housing, and
wherein adjusting operation of the furnace includes varying the speed of the first blower to remedy the detected upset.

16. A furnace, comprising:
a housing including first compartment and a second compartment separated by a vestibule;
a combustion assembly disposed in the first compartment that comprises:
a first blower including an inlet nozzle having an air inlet and a fuel inlet;
two or more burners that are configured to receive and combust a fuel/air mixture from the first blower, each burner aligned with a port in a premixing chamber and including a burner housing and a burner medium, wherein each burner medium is disposed between the premixing chamber and the respective burner housing, and each burner housing is a hollow cylindrical member;
a pair of electrodes extended inward toward the burner medium along the burner housing for a first burner of the two or more burners, and each electrode including an uninsulated portion disposed nearest the at least one burner; and
a flame sensor configured to detect an upset in the combustion of the fuel/air mixture, the flame sensor disposed through a side of the burner housing for a second burner of the two or more burners, the second burner being different from the first burner; and a heat exchanger assembly comprising:
   a heat exchanger disposed in the second compartment that is configured to receive flue products from the burner; and
   a second blower fluidly coupled to the heat exchanger that is disposed within the first compartment, wherein the second blower is configured to pull the flue products through the heat exchanger; and
a controller assembly coupled to at least the flame sensor and configured to adjust operation of the furnace in response to the detected upset,
wherein the air inlet of the first blower is arranged within the first compartment such that air pulled to the air inlet flows over a motor of the first blower and a motor of the second blower.

17. The furnace of claim 16, wherein an outer surface of the first compartment comprises a first opening and a second opening, wherein the motor of the first blower is disposed between the first opening and the air inlet along a first flow path of air into the air inlet, and wherein the motor of the second blower is disposed between the second opening and the air inlet along a second flow path of air into the air inlet.

18. The furnace of claim 17, wherein the first opening and the second opening are both formed on a door of the first compartment.

19. The furnace of claim 18, wherein the inlet nozzle is configured to pull a volume of fuel through the fuel inlet that is proportional to a volume of air pulled into the air inlet, so as to produce an fuel/air mixture having a fuel/air ratio that is configured to produce flue products having less than 14 Nano-grams per Joule (ng/J) of nitrogen oxides (NOx) when combusted in the burner.

20. The furnace of claim 15, comprising:
   a first sensor configured to detect a pressure of the inlet nozzle of the first blower;
   a second sensor to detect a speed of the first blower; and
   the controller assembly coupled to the first sensor, and the second sensor, wherein the controller assembly is configured to detect a blockage in the air inlet based on an output of the first sensor or the second sensor.

21. The furnace of claim 16, wherein the flame sensor configured to detect an upset in the combustion of the fuel/air mixture is further configured to detect the upset before an occurrence of flame loss, wherein the detected upset is a flame lift-off condition within at least the burner housing, and
   wherein the controller assembly configured to adjust operation of the furnace includes varying the speed of the first blower to remedy the detected upset.

* * * * *